(12) United States Patent
Stephens et al.

(10) Patent No.: US 10,483,510 B2
(45) Date of Patent: Nov. 19, 2019

(54) POLARIZED BATTERY TRAY FOR A VEHICLE

(71) Applicant: Shape Corp., Grand Haven, MI (US)

(72) Inventors: Mark Charles Stephens, Grand Rapids, MI (US); Joseph Robert Matecki, Allendale, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 15/981,654

(22) Filed: May 16, 2018

(65) Prior Publication Data

US 2018/0337378 A1 Nov. 22, 2018

Related U.S. Application Data

(60) Provisional application No. 62/506,943, filed on May 16, 2017, provisional application No. 62/636,312, filed on Feb. 28, 2018.

(51) Int. Cl.
*H01M 2/10* (2006.01)
*B60L 50/64* (2019.01)
(Continued)

(52) U.S. Cl.
CPC ........... *H01M 2/1083* (2013.01); *B60L 50/64* (2019.02); *B60L 50/66* (2019.02); *H01M 2/1077* (2013.01); *B60R 16/04* (2013.01); *H01M 2220/20* (2013.01)

(58) Field of Classification Search
CPC ............................................ B60K 2001/0438
See application file for complete search history.

(56) References Cited

U.S. PATENT DOCUMENTS

| 3,708,028 A | 1/1973 | Hafer |
| 3,930,552 A | 1/1976 | Kunkle et al. |

(Continued)

FOREIGN PATENT DOCUMENTS

| AT | 511428 A1 | 11/2012 |
| AT | 511670 A1 | 1/2013 |

(Continued)

OTHER PUBLICATIONS

Korean Intellectual Property Office (ISA), International Search Report and Written Opinion for International Application No. PCT/US2018/033009, dated Sep. 11, 2018.

(Continued)

*Primary Examiner* — Brian L Swenson
(74) *Attorney, Agent, or Firm* — Honigman LLP

(57) ABSTRACT

A battery tray for a vehicle includes two tray components or pieces that attach or mate together, such as with one tray component over or within the other tray component, to form sealed and separate battery containment areas. The lower tray component that has a panel portion and a pair of elongated reinforcement members integrally protruding upward from opposing edges of the panel portion. Also, the upper tray component has a panel portion and a cross members that integrally extend across its panel portion. The upper tray component is disposed at an upper surface of the panel portion of the lower tray component with the cross members extending between the elongated reinforcement members and defining a battery containment area between each of the cross members.

22 Claims, 15 Drawing Sheets

(51) Int. Cl.
*B60L 50/60* (2019.01)
*B60R 16/04* (2006.01)

(56) References Cited

U.S. PATENT DOCUMENTS

| | | |
|---|---|---|
| 3,983,952 A | 10/1976 | McKee |
| 4,174,014 A | 11/1979 | Bjorksten |
| 4,252,206 A | 2/1981 | Burkholder et al. |
| 4,317,497 A | 3/1982 | Alt et al. |
| 4,506,748 A | 3/1985 | Thomas |
| 5,015,545 A | 5/1991 | Brooks |
| 5,378,555 A | 1/1995 | Waters et al. |
| 5,390,754 A | 2/1995 | Masuyama et al. |
| 5,392,873 A | 2/1995 | Masuyama et al. |
| 5,476,151 A | 12/1995 | Tsuchida et al. |
| 5,501,289 A | 3/1996 | Nishikawa et al. |
| 5,513,721 A | 5/1996 | Ogawa et al. |
| 5,523,666 A | 6/1996 | Hoelzl et al. |
| 5,534,364 A | 7/1996 | Watanabe et al. |
| 5,549,443 A | 8/1996 | Hammerslag |
| 5,555,950 A | 9/1996 | Harada et al. |
| 5,558,949 A | 9/1996 | Iwatsuki et al. |
| 5,561,359 A | 10/1996 | Matsuura et al. |
| 5,567,542 A | 10/1996 | Bae |
| 5,585,204 A | 12/1996 | Oshida et al. |
| 5,585,205 A | 12/1996 | Kohchi |
| 5,612,606 A | 3/1997 | Guimarin et al. |
| 5,620,057 A | 4/1997 | Klemen et al. |
| 5,709,280 A | 1/1998 | Beckley et al. |
| 5,736,272 A | 4/1998 | Veenstra et al. |
| 5,760,569 A | 6/1998 | Chase, Jr. |
| 5,833,023 A | 11/1998 | Shimizu |
| 5,853,058 A | 12/1998 | Endo et al. |
| 5,866,276 A | 2/1999 | Ogami et al. |
| 6,040,080 A | 3/2000 | Minami et al. |
| 6,085,854 A | 7/2000 | Nishikawa |
| 6,094,927 A | 8/2000 | Anazawa et al. |
| 6,109,380 A | 8/2000 | Veenstra |
| 6,130,003 A | 10/2000 | Etoh et al. |
| 6,158,538 A | 12/2000 | Botzelmann et al. |
| 6,188,574 B1 | 2/2001 | Anazawa |
| 6,189,635 B1 | 2/2001 | Schuler et al. |
| 6,220,380 B1 | 4/2001 | Mita et al. |
| 6,227,322 B1 | 5/2001 | Nishikawa |
| 6,260,645 B1 | 7/2001 | Pawlowski et al. |
| 6,402,229 B1 | 6/2002 | Suganuma |
| 6,406,812 B1 | 6/2002 | Dreulle et al. |
| 6,462,949 B1 | 10/2002 | Parish, IV et al. |
| 6,541,151 B2 | 4/2003 | Minamiura et al. |
| 6,541,154 B2 | 4/2003 | Oogami et al. |
| 6,565,836 B2 | 5/2003 | Ovshinsky et al. |
| 6,598,691 B2 | 7/2003 | Mita et al. |
| 6,648,090 B2 | 11/2003 | Iwase |
| 6,668,957 B2 | 12/2003 | King |
| 6,736,229 B1 | 5/2004 | Amori et al. |
| 6,811,197 B1 | 11/2004 | Grabowski et al. |
| 7,004,274 B2 | 2/2006 | Shibasawa et al. |
| 7,017,361 B2 | 3/2006 | Kwon |
| 7,070,015 B2 | 7/2006 | Mathews et al. |
| 7,128,999 B1 | 10/2006 | Martin et al. |
| 7,201,384 B2 | 4/2007 | Chaney |
| 7,207,405 B2 | 4/2007 | Reid et al. |
| 7,221,123 B2 | 5/2007 | Chen |
| 7,249,644 B2 | 7/2007 | Honda et al. |
| 7,267,190 B2 | 9/2007 | Hirano |
| 7,323,272 B2 | 1/2008 | Ambrosio et al. |
| 7,401,669 B2 | 7/2008 | Fujii et al. |
| 7,405,022 B2 | 7/2008 | Kang et al. |
| 7,412,309 B2 | 8/2008 | Honda |
| 7,416,039 B1 | 8/2008 | Anderson et al. |
| 7,424,926 B2 | 9/2008 | Tsuchiya |
| 7,427,156 B2 | 9/2008 | Ambrosio et al. |
| 7,501,793 B2 | 3/2009 | Kadouchi et al. |
| 7,507,499 B2 | 3/2009 | Zhou |
| 7,520,355 B2 | 4/2009 | Chaney |
| 7,610,978 B2 | 11/2009 | Takasaki et al. |
| 7,654,351 B2 | 2/2010 | Koike et al. |
| 7,654,352 B2 | 2/2010 | Takasaki et al. |
| 7,661,370 B2 | 2/2010 | Pike et al. |
| 7,686,111 B2 | 3/2010 | Koenekamp et al. |
| 7,687,192 B2 | 3/2010 | Yoon et al. |
| 7,713,655 B2 | 5/2010 | Ha et al. |
| 7,749,644 B2 | 7/2010 | Nishino |
| 7,807,288 B2 | 10/2010 | Yoon et al. |
| 7,854,282 B2 | 12/2010 | Lee et al. |
| 7,858,229 B2 | 12/2010 | Shin et al. |
| 7,875,378 B2 | 1/2011 | Yang et al. |
| 7,879,480 B2 | 2/2011 | Yoon et al. |
| 7,879,485 B2 | 2/2011 | Yoon et al. |
| 7,926,602 B2 | 4/2011 | Takasaki |
| 7,931,105 B2 | 4/2011 | Sato et al. |
| 7,948,207 B2 | 5/2011 | Scheucher |
| 7,967,093 B2 | 6/2011 | Nagasaka |
| 7,984,779 B2 | 7/2011 | Boegelein et al. |
| 7,990,105 B2 | 8/2011 | Matsumoto et al. |
| 7,993,155 B2 | 8/2011 | Heichal et al. |
| 7,997,368 B2 | 8/2011 | Takasaki et al. |
| 8,006,626 B2 | 8/2011 | Kumar et al. |
| 8,006,793 B2 | 8/2011 | Heichal et al. |
| 8,012,620 B2 | 9/2011 | Takasaki et al. |
| 8,034,476 B2 | 10/2011 | Ha et al. |
| 8,037,954 B2 | 10/2011 | Taguchi |
| 8,079,435 B2 | 12/2011 | Takasaki et al. |
| 8,091,669 B2 | 1/2012 | Taneda et al. |
| 8,110,300 B2 | 2/2012 | Niedzwiecki et al. |
| 8,146,694 B2 | 4/2012 | Hamidi |
| 8,163,420 B2 | 4/2012 | Okada et al. |
| 8,167,070 B2 | 5/2012 | Takamura et al. |
| 8,186,468 B2 | 5/2012 | Parrett et al. |
| 8,187,736 B2 | 5/2012 | Park et al. |
| 8,205,702 B2 | 6/2012 | Hoermandinger et al. |
| 8,206,846 B2 | 6/2012 | Yang et al. |
| 8,210,301 B2 | 7/2012 | Hashimoto et al. |
| 8,211,564 B2 | 7/2012 | Choi et al. |
| 8,256,552 B2 | 9/2012 | Okada |
| 8,268,469 B2 | 9/2012 | Hermann et al. |
| 8,268,472 B2 | 9/2012 | Ronning et al. |
| 8,276,697 B2 | 10/2012 | Takasaki |
| 8,286,743 B2 | 10/2012 | Rawlinson |
| 8,298,698 B2 | 10/2012 | Chung et al. |
| 8,304,104 B2 | 11/2012 | Lee et al. |
| 8,307,930 B2 | 11/2012 | Sailor et al. |
| 8,323,819 B2 | 12/2012 | Lee et al. |
| 8,327,962 B2 | 12/2012 | Bergmeier et al. |
| 8,343,647 B2 | 1/2013 | Ahn et al. |
| 8,353,374 B2 | 1/2013 | Sugawara et al. |
| 8,371,401 B1 | 2/2013 | Illustrato |
| 8,397,853 B2 | 3/2013 | Stefani et al. |
| 8,409,743 B2 | 4/2013 | Okada et al. |
| 8,418,795 B2 | 4/2013 | Sasage et al. |
| 8,420,245 B2 | 4/2013 | Im et al. |
| 8,439,144 B2 | 5/2013 | Murase |
| 8,453,773 B2 | 6/2013 | Hill et al. |
| 8,453,778 B2 | 6/2013 | Bannier et al. |
| 8,455,122 B2 | 6/2013 | Shin et al. |
| 8,465,866 B2 | 6/2013 | Kim |
| 8,481,343 B2 | 7/2013 | Hsin et al. |
| 8,486,557 B2 | 7/2013 | Lee et al. |
| 8,492,016 B2 | 7/2013 | Shin et al. |
| 8,501,344 B2 | 8/2013 | Yang et al. |
| 8,511,412 B2 | 8/2013 | Kawaguchi et al. |
| 8,540,282 B2 | 9/2013 | Yoda et al. |
| 8,551,640 B2 | 10/2013 | Hedrich et al. |
| 8,557,425 B2 | 10/2013 | Ronning et al. |
| 8,561,743 B2 | 10/2013 | Iwasa et al. |
| 8,563,155 B2 | 10/2013 | Lee et al. |
| 8,567,543 B2 | 10/2013 | Kubota et al. |
| 8,584,780 B2 | 11/2013 | Yu et al. |
| 8,587,907 B2 | 11/2013 | Gaben |
| 8,592,069 B1 | 11/2013 | Anderson et al. |
| 8,602,139 B2 | 12/2013 | Takamura et al. |
| 8,609,271 B2 | 12/2013 | Yoon et al. |
| 8,658,303 B2 | 2/2014 | Chung et al. |
| 8,672,077 B2 | 3/2014 | Sand et al. |

(56) References Cited

U.S. PATENT DOCUMENTS

| | | |
|---|---|---|
| 8,672,354 B2 | 3/2014 | Kim et al. |
| 8,689,918 B2 | 4/2014 | Yu et al. |
| 8,689,919 B2 | 4/2014 | Maeda et al. |
| 8,691,421 B2 | 4/2014 | Lee et al. |
| 8,708,080 B2 | 4/2014 | Lee et al. |
| 8,708,402 B2 | 4/2014 | Saeki |
| 8,709,628 B2 | 4/2014 | Carignan et al. |
| 8,722,224 B2 | 5/2014 | Lee et al. |
| 8,728,648 B2 | 5/2014 | Choo et al. |
| 8,733,486 B2 | 5/2014 | Nishiura et al. |
| 8,733,488 B2 | 5/2014 | Umetani |
| 8,739,908 B2 | 6/2014 | Taniguchi et al. |
| 8,739,909 B2 | 6/2014 | Hashimoto et al. |
| 8,741,466 B2 | 6/2014 | Youngs et al. |
| 8,746,391 B2 | 6/2014 | Atsuchi et al. |
| 8,757,304 B2 | 6/2014 | Amano et al. |
| 8,789,634 B2 | 7/2014 | Nitawaki |
| 8,794,365 B2 | 8/2014 | Matsuzawa et al. |
| 8,802,259 B2 | 8/2014 | Lee et al. |
| 8,803,477 B2 | 8/2014 | Kittell |
| 8,808,893 B2 | 8/2014 | Choo et al. |
| 8,818,588 B2 | 8/2014 | Ambrosio et al. |
| 8,820,444 B2 | 9/2014 | Nguyen |
| 8,820,461 B2 | 9/2014 | Shinde et al. |
| 8,827,023 B2 | 9/2014 | Matsuda et al. |
| 8,833,495 B2 | 9/2014 | Iwata et al. |
| 8,833,499 B2 | 9/2014 | Rawlinson |
| 8,835,033 B2 | 9/2014 | Choi et al. |
| 8,841,013 B2 | 9/2014 | Choo et al. |
| 8,846,233 B2 | 9/2014 | Lee et al. |
| 8,846,234 B2 | 9/2014 | Lee et al. |
| 8,852,794 B2 | 10/2014 | Laitinen |
| 8,862,296 B2 | 10/2014 | Kurakawa et al. |
| 8,865,332 B2 | 10/2014 | Yang et al. |
| 8,875,828 B2 | 11/2014 | Rawlinson et al. |
| 8,895,173 B2 | 11/2014 | Gandhi et al. |
| 8,900,736 B2 | 12/2014 | Choi et al. |
| 8,905,170 B2 | 12/2014 | Kyoden et al. |
| 8,905,171 B2 | 12/2014 | Lee et al. |
| 8,911,899 B2 | 12/2014 | Lim et al. |
| 8,936,125 B2 | 1/2015 | Nakamori |
| 8,939,245 B2 | 1/2015 | Jaffrezic |
| 8,939,246 B2 | 1/2015 | Yamaguchi et al. |
| 8,951,655 B2 | 2/2015 | Chung et al. |
| 8,960,346 B2 | 2/2015 | Ogawa |
| 8,970,061 B2 | 3/2015 | Nakagawa et al. |
| 8,973,697 B2 | 3/2015 | Matsuda |
| 8,975,774 B2 | 3/2015 | Kreutzer et al. |
| 8,978,800 B2 | 3/2015 | Soma' et al. |
| 8,980,458 B2 | 3/2015 | Honjo et al. |
| 8,986,864 B2 | 3/2015 | Wiegmann et al. |
| 9,004,535 B2 | 4/2015 | Wu |
| 9,012,051 B2 | 4/2015 | Lee et al. |
| 9,017,846 B2 | 4/2015 | Kawatani et al. |
| 9,023,502 B2 | 5/2015 | Favaretto |
| 9,023,503 B2 | 5/2015 | Seong et al. |
| 9,024,572 B2 | 5/2015 | Nishihara et al. |
| 9,033,084 B2 | 5/2015 | Joye |
| 9,033,085 B1 | 5/2015 | Rawlinson |
| 9,034,502 B2 | 5/2015 | Kano et al. |
| 9,052,168 B1 | 6/2015 | Rawlinson |
| 9,054,402 B1 | 6/2015 | Rawlinson |
| 9,061,714 B1 | 6/2015 | Albery et al. |
| 9,065,103 B2 | 6/2015 | Straubel et al. |
| 9,070,926 B2 | 6/2015 | Seong et al. |
| 9,073,426 B2 | 7/2015 | Tachikawa et al. |
| 9,077,058 B2 | 7/2015 | Yang et al. |
| 9,090,218 B2 | 7/2015 | Karashima |
| 9,093,701 B2 | 7/2015 | Kawatani et al. |
| 9,101,060 B2 | 8/2015 | Yamanaka et al. |
| 9,102,362 B2 | 8/2015 | Baccouche et al. |
| 9,126,637 B2 | 9/2015 | Eberle et al. |
| 9,136,514 B2 | 9/2015 | Kawatani et al. |
| 9,156,340 B2 | 10/2015 | van den Akker |
| 9,159,968 B2 | 10/2015 | Park et al. |
| 9,159,970 B2 | 10/2015 | Watanabe et al. |
| 9,160,042 B2 | 10/2015 | Fujii et al. |
| 9,160,214 B2 | 10/2015 | Matsuda |
| 9,172,071 B2 | 10/2015 | Yoshioka et al. |
| 9,174,520 B2 | 11/2015 | Katayama et al. |
| 9,184,477 B2 | 11/2015 | Jeong et al. |
| 9,192,450 B2 | 11/2015 | Yamashita et al. |
| 9,193,316 B2 | 11/2015 | McLaughlin et al. |
| 9,196,882 B2 | 11/2015 | Seong et al. |
| 9,203,064 B2 | 12/2015 | Lee et al. |
| 9,203,124 B2 | 12/2015 | Chung et al. |
| 9,205,749 B2 | 12/2015 | Sakamoto |
| 9,205,757 B2 | 12/2015 | Matsuda |
| 9,216,638 B2 | 12/2015 | Katayama et al. |
| 9,227,582 B2 | 1/2016 | Katayama et al. |
| 9,231,285 B2 | 1/2016 | Schmidt et al. |
| 9,236,587 B2 | 1/2016 | Lee et al. |
| 9,236,589 B2 | 1/2016 | Lee |
| 9,238,495 B2 | 1/2016 | Matsuda |
| 9,246,148 B2 | 1/2016 | Maguire |
| 9,252,409 B2 | 2/2016 | Lee et al. |
| 9,254,871 B2 | 2/2016 | Hotta et al. |
| 9,263,249 B2 | 2/2016 | Tomohiro et al. |
| 9,269,934 B2 | 2/2016 | Yang et al. |
| 9,277,674 B2 | 3/2016 | Watanabe |
| 9,281,546 B2 | 3/2016 | Chung et al. |
| 9,283,837 B1 | 3/2016 | Rawlinson |
| 9,306,201 B2 | 4/2016 | Lu et al. |
| 9,306,247 B2 | 4/2016 | Rawlinson |
| 9,308,829 B2 | 4/2016 | Matsuda |
| 9,308,966 B2 | 4/2016 | Kosuge et al. |
| 9,312,579 B2 | 4/2016 | Jeong et al. |
| 9,321,357 B2 | 4/2016 | Caldeira et al. |
| 9,321,433 B2 | 4/2016 | Yin et al. |
| 9,327,586 B2 | 5/2016 | Miyashiro |
| 9,331,321 B2 | 5/2016 | Berger et al. |
| 9,331,366 B2 | 5/2016 | Fuerstner et al. |
| 9,333,868 B2 | 5/2016 | Uchida et al. |
| 9,337,455 B2 | 5/2016 | Yang et al. |
| 9,337,457 B2 | 5/2016 | Yajima et al. |
| 9,337,458 B2 | 5/2016 | Kim |
| 9,337,516 B2 | 5/2016 | Klausner et al. |
| 9,346,346 B2 | 5/2016 | Murray |
| 9,350,003 B2 | 5/2016 | Wen et al. |
| 9,358,869 B2 | 6/2016 | Le Jaouen et al. |
| 9,373,828 B2 | 6/2016 | Kawatani et al. |
| 9,381,798 B2 | 7/2016 | Meyer-Ebeling |
| 9,412,984 B2 | 8/2016 | Fritz et al. |
| 9,413,043 B2 | 8/2016 | Kim et al. |
| 9,425,628 B2 | 8/2016 | Pham et al. |
| 9,434,243 B2 | 9/2016 | Nakao |
| 9,434,270 B1 | 9/2016 | Penilla et al. |
| 9,434,333 B2 | 9/2016 | Sloan et al. |
| 9,444,082 B2 | 9/2016 | Tsujimura et al. |
| 9,446,643 B1 | 9/2016 | Vollmer |
| 9,450,228 B2 | 9/2016 | Sakai et al. |
| 9,452,686 B2 | 9/2016 | Yang et al. |
| 9,457,666 B2 | 10/2016 | Caldeira et al. |
| 9,461,284 B2 | 10/2016 | Power et al. |
| 9,461,454 B2 | 10/2016 | Auguet et al. |
| 9,463,695 B2 | 10/2016 | Matsuda et al. |
| 9,478,778 B2 | 10/2016 | Im et al. |
| 9,481,249 B2 | 11/2016 | Yamazaki |
| 9,484,564 B2 | 11/2016 | Stuetz et al. |
| 9,484,592 B2 | 11/2016 | Roh et al. |
| 9,487,237 B1 | 11/2016 | Vollmer |
| 9,502,700 B2 | 11/2016 | Haussman |
| 9,520,624 B2 | 12/2016 | Lee et al. |
| 9,531,041 B2 | 12/2016 | Hwang |
| 9,533,546 B2 | 1/2017 | Cheng |
| 9,533,600 B1 | 1/2017 | Schwab et al. |
| 9,537,186 B2 | 1/2017 | Chung et al. |
| 9,537,187 B2 | 1/2017 | Chung et al. |
| 9,540,055 B2 | 1/2017 | Berger et al. |
| 9,545,962 B2 | 1/2017 | Pang |
| 9,545,968 B2 | 1/2017 | Miyashiro et al. |
| 9,561,735 B2 | 2/2017 | Nozaki |
| 9,564,663 B2 | 2/2017 | Kim et al. |
| 9,564,664 B2 | 2/2017 | Tanigaki et al. |

(56) References Cited

U.S. PATENT DOCUMENTS

| | | |
|---|---|---|
| 9,579,963 B2 | 2/2017 | Landgraf |
| 9,579,983 B2 | 2/2017 | Inoue |
| 9,579,986 B2 | 2/2017 | Bachir |
| 9,590,216 B2 | 3/2017 | Maguire et al. |
| 9,597,973 B2 | 3/2017 | Penilla et al. |
| 9,597,976 B2 | 3/2017 | Dickinson et al. |
| 9,608,244 B2 | 3/2017 | Shin et al. |
| 9,614,206 B2 | 4/2017 | Choi et al. |
| 9,614,260 B2 | 4/2017 | Kim et al. |
| 9,616,766 B2 | 4/2017 | Fujii |
| 9,620,826 B2 | 4/2017 | Yang et al. |
| 9,623,742 B2 | 4/2017 | Ikeda et al. |
| 9,623,911 B2 | 4/2017 | Kano et al. |
| 9,627,664 B2 | 4/2017 | Choo et al. |
| 9,627,666 B2 | 4/2017 | Baldwin |
| 9,630,483 B2 | 4/2017 | Yamada et al. |
| 9,636,984 B1 | 5/2017 | Baccouche et al. |
| 9,643,660 B2 | 5/2017 | Vollmer |
| 9,647,251 B2 | 5/2017 | Prinz et al. |
| 9,653,712 B2 | 5/2017 | Seong et al. |
| 9,660,236 B2 | 5/2017 | Kondo et al. |
| 9,660,288 B2 | 5/2017 | Gendlin et al. |
| 9,660,304 B2 | 5/2017 | Choi et al. |
| 9,673,433 B1 | 6/2017 | Pullalarevu et al. |
| 9,673,495 B2 | 6/2017 | Lee et al. |
| 9,692,095 B2 | 6/2017 | Harris |
| 9,694,772 B2 | 7/2017 | Ikeda et al. |
| 9,789,908 B2 | 10/2017 | Tsukada et al. |
| 9,796,424 B2 | 10/2017 | Sakaguchi et al. |
| 9,802,650 B2 | 10/2017 | Nishida et al. |
| 10,059,382 B2 | 8/2018 | Nusier et al. |
| 2001/0046624 A1 | 11/2001 | Goto et al. |
| 2001/0052433 A1 | 12/2001 | Harris et al. |
| 2002/0066608 A1 | 6/2002 | Guenard et al. |
| 2003/0089540 A1 | 5/2003 | Koike et al. |
| 2003/0188417 A1 | 10/2003 | McGlinchy et al. |
| 2003/0209375 A1 | 11/2003 | Suzuki et al. |
| 2003/0230443 A1 | 12/2003 | Cramer et al. |
| 2004/0142232 A1 | 7/2004 | Risca et al. |
| 2004/0261377 A1 | 12/2004 | Sung |
| 2005/0095500 A1 | 5/2005 | Corless et al. |
| 2006/0001399 A1 | 1/2006 | Salasoo et al. |
| 2006/0024566 A1 | 2/2006 | Plummer |
| 2008/0179040 A1 | 7/2008 | Rosenbaum |
| 2008/0199771 A1 | 8/2008 | Chiu |
| 2008/0238152 A1 | 10/2008 | Konishi et al. |
| 2008/0280192 A1 | 11/2008 | Drozdz et al. |
| 2008/0311468 A1 | 12/2008 | Hermann et al. |
| 2009/0014221 A1 | 1/2009 | Kim et al. |
| 2009/0058355 A1 | 3/2009 | Meyer |
| 2010/0025131 A1 | 2/2010 | Gloceri et al. |
| 2010/0112419 A1 | 5/2010 | Jang et al. |
| 2010/0159317 A1 | 6/2010 | Taghikhani et al. |
| 2010/0173191 A1 | 7/2010 | Meintschel et al. |
| 2010/0307848 A1 | 12/2010 | Hashimoto et al. |
| 2011/0036657 A1 | 2/2011 | Bland et al. |
| 2011/0070474 A1 | 3/2011 | Lee et al. |
| 2011/0104530 A1 | 5/2011 | Muller et al. |
| 2011/0123309 A1 | 5/2011 | Berdelle-Hilge et al. |
| 2011/0132580 A1 | 6/2011 | Herrmann et al. |
| 2011/0143179 A1 | 6/2011 | Nakamori |
| 2011/0168461 A1 | 7/2011 | Meyer-Ebeling |
| 2011/0240385 A1 | 10/2011 | Farmer |
| 2012/0091955 A1 | 4/2012 | Gao |
| 2012/0103714 A1 | 5/2012 | Choi et al. |
| 2012/0118653 A1 | 5/2012 | Ogihara et al. |
| 2012/0125702 A1 | 5/2012 | Bergfjord |
| 2012/0129031 A1 | 5/2012 | Kim |
| 2012/0223113 A1 | 9/2012 | Gaisne et al. |
| 2012/0298433 A1 | 11/2012 | Ohkura |
| 2012/0301765 A1* | 11/2012 | Loo .................. H01M 2/1083 |
| | | 429/100 |
| 2012/0312610 A1 | 12/2012 | Kim et al. |
| 2013/0020139 A1 | 1/2013 | Kim et al. |
| 2013/0122337 A1 | 5/2013 | Katayama et al. |
| 2013/0122338 A1 | 5/2013 | Katayama et al. |
| 2013/0143081 A1 | 6/2013 | Watanabe et al. |
| 2013/0164580 A1 | 6/2013 | Au |
| 2013/0192908 A1 | 8/2013 | Schlagheck |
| 2013/0230759 A1 | 9/2013 | Jeong et al. |
| 2013/0270863 A1 | 10/2013 | Young et al. |
| 2013/0273829 A1 | 10/2013 | Obasih et al. |
| 2013/0284531 A1 | 10/2013 | Oonuma et al. |
| 2013/0337297 A1 | 12/2013 | Lee et al. |
| 2014/0017546 A1 | 1/2014 | Yanagi |
| 2014/0045026 A1 | 2/2014 | Fritz et al. |
| 2014/0072845 A1 | 3/2014 | Oh et al. |
| 2014/0072856 A1 | 3/2014 | Chung et al. |
| 2014/0087228 A1 | 3/2014 | Fabian et al. |
| 2014/0120406 A1 | 5/2014 | Kim |
| 2014/0141298 A1 | 5/2014 | Michelitsch |
| 2014/0178721 A1 | 6/2014 | Chung et al. |
| 2014/0193683 A1 | 7/2014 | Mardall et al. |
| 2014/0202671 A1 | 7/2014 | Yan |
| 2014/0212723 A1 | 7/2014 | Lee et al. |
| 2014/0242429 A1 | 8/2014 | Lee et al. |
| 2014/0246259 A1 | 9/2014 | Yamamura et al. |
| 2014/0262573 A1 | 9/2014 | Ito et al. |
| 2014/0272501 A1 | 9/2014 | O'Brien et al. |
| 2014/0284125 A1 | 9/2014 | Katayama et al. |
| 2014/0302360 A1 | 10/2014 | Klammler et al. |
| 2014/0322583 A1 | 10/2014 | Choi et al. |
| 2014/0338999 A1 | 11/2014 | Fujii et al. |
| 2015/0004458 A1 | 1/2015 | Lee |
| 2015/0010795 A1 | 1/2015 | Tanigaki et al. |
| 2015/0053493 A1 | 2/2015 | Kees et al. |
| 2015/0056481 A1 | 2/2015 | Cohen et al. |
| 2015/0060164 A1 | 3/2015 | Wang et al. |
| 2015/0061381 A1 | 3/2015 | Biskup |
| 2015/0061413 A1 | 3/2015 | Janarthanam et al. |
| 2015/0064535 A1 | 3/2015 | Seong et al. |
| 2015/0104686 A1 | 4/2015 | Brommer et al. |
| 2015/0136506 A1 | 5/2015 | Quinn et al. |
| 2015/0188207 A1 | 7/2015 | Son et al. |
| 2015/0207115 A1 | 7/2015 | Wondraczek |
| 2015/0236326 A1 | 8/2015 | Kim et al. |
| 2015/0243956 A1 | 8/2015 | Loo et al. |
| 2015/0255764 A1 | 9/2015 | Loo et al. |
| 2015/0280188 A1 | 10/2015 | Nozaki et al. |
| 2015/0291046 A1 | 10/2015 | Kawabata |
| 2015/0298661 A1 | 10/2015 | Zhang |
| 2015/0314830 A1 | 11/2015 | Inoue |
| 2015/0329174 A1 | 11/2015 | Inoue |
| 2015/0329175 A1 | 11/2015 | Inoue |
| 2015/0329176 A1 | 11/2015 | Inoue |
| 2015/0344081 A1 | 12/2015 | Kor et al. |
| 2016/0023689 A1 | 1/2016 | Berger et al. |
| 2016/0028056 A1 | 1/2016 | Lee et al. |
| 2016/0068195 A1 | 3/2016 | Hentrich et al. |
| 2016/0072108 A1 | 3/2016 | Keller et al. |
| 2016/0087319 A1 | 3/2016 | Roh et al. |
| 2016/0093856 A1 | 3/2016 | DeKeuster et al. |
| 2016/0133899 A1 | 5/2016 | Qiao et al. |
| 2016/0137046 A1 | 5/2016 | Song |
| 2016/0141738 A1 | 5/2016 | Kwag |
| 2016/0149177 A1 | 5/2016 | Sugeno et al. |
| 2016/0156005 A1 | 6/2016 | Elliot et al. |
| 2016/0159221 A1 | 6/2016 | Chen et al. |
| 2016/0164053 A1 | 6/2016 | Lee et al. |
| 2016/0167544 A1* | 6/2016 | Barbat ..................... B60K 1/04 |
| | | 180/68.5 |
| 2016/0176312 A1 | 6/2016 | Duhaime et al. |
| 2016/0197332 A1 | 7/2016 | Lee et al. |
| 2016/0197386 A1 | 7/2016 | Moon et al. |
| 2016/0197387 A1 | 7/2016 | Lee et al. |
| 2016/0204398 A1 | 7/2016 | Moon et al. |
| 2016/0207418 A1 | 7/2016 | Bergstrom et al. |
| 2016/0218335 A1 | 7/2016 | Baek |
| 2016/0222631 A1 | 8/2016 | Kohno et al. |
| 2016/0226040 A1 | 8/2016 | Mongeau et al. |
| 2016/0226108 A1 | 8/2016 | Kim et al. |
| 2016/0229309 A1 | 8/2016 | Mitsutani |
| 2016/0233468 A1 | 8/2016 | Nusier et al. |
| 2016/0236713 A1 | 8/2016 | Sakaguchi et al. |

(56) References Cited

U.S. PATENT DOCUMENTS

| | | |
|---|---|---|
| 2016/0248060 A1 | 8/2016 | Brambrink et al. |
| 2016/0248061 A1 | 8/2016 | Brambrink et al. |
| 2016/0257219 A1 | 9/2016 | Miller et al. |
| 2016/0280306 A1 | 9/2016 | Miyashiro et al. |
| 2016/0308180 A1 | 10/2016 | Kohda |
| 2016/0318579 A1 | 11/2016 | Miyashiro |
| 2016/0339855 A1 | 11/2016 | Chinavare et al. |
| 2016/0347161 A1 | 12/2016 | Kusumi et al. |
| 2016/0361984 A1 | 12/2016 | Manganaro |
| 2016/0368358 A1 | 12/2016 | Nagaosa |
| 2016/0375750 A1 | 12/2016 | Hokazono et al. |
| 2017/0001507 A1 | 1/2017 | Ashraf et al. |
| 2017/0005303 A1 | 1/2017 | Harris et al. |
| 2017/0005371 A1 | 1/2017 | Chidester et al. |
| 2017/0005375 A1 | 1/2017 | Walker |
| 2017/0029034 A1 | 2/2017 | Faruque et al. |
| 2017/0047563 A1 | 2/2017 | Lee et al. |
| 2017/0050533 A1 | 2/2017 | Wei et al. |
| 2017/0054120 A1 | 2/2017 | Templeman et al. |
| 2017/0062782 A1 | 3/2017 | Cho et al. |
| 2017/0084890 A1 | 3/2017 | Subramanian et al. |
| 2017/0088013 A1 | 3/2017 | Shimizu et al. |
| 2017/0088178 A1 | 3/2017 | Tsukada et al. |
| 2017/0106907 A1 | 4/2017 | Gong et al. |
| 2017/0106908 A1 | 4/2017 | Song |
| 2017/0144566 A1 | 5/2017 | Aschwer et al. |
| 2017/0190243 A1 | 7/2017 | Duan et al. |
| 2017/0194681 A1 | 7/2017 | Kim et al. |
| 2017/0200925 A1 | 7/2017 | Seo et al. |
| 2017/0214018 A1 | 7/2017 | Sun et al. |
| 2017/0222199 A1 | 8/2017 | Idikurt et al. |
| 2017/0232859 A1 | 8/2017 | Li |
| 2017/0288185 A1 | 10/2017 | Maguire |
| 2017/0331086 A1 | 11/2017 | Frehn et al. |
| 2018/0050607 A1 | 2/2018 | Matecki et al. |
| 2018/0062224 A1 | 3/2018 | Drabon et al. |
| 2018/0154754 A1 | 6/2018 | Rowley et al. |
| 2018/0186227 A1 | 7/2018 | Stephens et al. |
| 2018/0229593 A1 | 8/2018 | Hitz et al. |
| 2018/0233789 A1 | 8/2018 | Iqbal et al. |
| 2018/0236863 A1 | 8/2018 | Kawabe et al. |
| 2018/0237075 A1 | 8/2018 | Kawabe |
| 2018/0323409 A1 | 11/2018 | Maier |
| 2018/0334022 A1 | 11/2018 | Rawlinson et al. |
| 2018/0337374 A1 | 11/2018 | Matecki et al. |
| 2018/0337377 A1 | 11/2018 | Stephens et al. |
| 2018/0337378 A1 | 11/2018 | Stephens et al. |
| 2019/0081298 A1 | 3/2019 | Matecki et al. |
| 2019/0100090 A1 | 4/2019 | Matecki et al. |

FOREIGN PATENT DOCUMENTS

| | | |
|---|---|---|
| AU | 2008200543 A1 | 8/2009 |
| CN | 100429805 C | 10/2008 |
| CN | 100429806 C | 10/2008 |
| CN | 102452293 A | 5/2012 |
| CN | 102802983 A | 11/2012 |
| CN | 103568820 A | 2/2014 |
| CN | 104010884 A | 8/2014 |
| CN | 106029407 A | 10/2016 |
| CN | 205645923 U | 10/2016 |
| CN | 106207029 A | 12/2016 |
| CN | 106410077 A | 2/2017 |
| DE | 4105246 A1 | 8/1992 |
| DE | 4129351 A1 | 5/1993 |
| DE | 4427322 A1 | 2/1996 |
| DE | 19534427 A1 | 3/1996 |
| DE | 4446257 A1 | 6/1996 |
| DE | 202005018897 U1 | 2/2006 |
| DE | 102004062932 A1 | 8/2006 |
| DE | 102007012893 A1 | 3/2008 |
| DE | 102007017019 A1 | 3/2008 |
| DE | 102007030542 A1 | 3/2008 |
| DE | 102006049269 A1 | 6/2008 |
| DE | 202008006698 U1 | 7/2008 |
| DE | 102007011026 A1 | 9/2008 |
| DE | 102007021293 A1 | 11/2008 |
| DE | 102007044526 A1 | 3/2009 |
| DE | 102007050103 A1 | 4/2009 |
| DE | 102007063187 B3 | 4/2009 |
| DE | 102008051786 A1 | 4/2009 |
| DE | 102007063194 A1 | 6/2009 |
| DE | 102008034880 A1 | 6/2009 |
| DE | 102007061562 A1 | 7/2009 |
| DE | 102008010813 A1 | 8/2009 |
| DE | 102008024007 A1 | 12/2009 |
| DE | 102008034695 A1 | 1/2010 |
| DE | 102008034700 A1 | 1/2010 |
| DE | 102008034856 A1 | 1/2010 |
| DE | 102008034860 A1 | 1/2010 |
| DE | 102008034863 A1 | 1/2010 |
| DE | 102008034873 A1 | 1/2010 |
| DE | 102008034889 A1 | 1/2010 |
| DE | 102008052284 A1 | 4/2010 |
| DE | 102008059953 A1 | 6/2010 |
| DE | 102008059964 A1 | 6/2010 |
| DE | 102008059966 A1 | 6/2010 |
| DE | 102008059967 A1 | 6/2010 |
| DE | 102008059969 A1 | 6/2010 |
| DE | 102008059971 A1 | 6/2010 |
| DE | 102008054968 A1 | 7/2010 |
| DE | 102010006514 A1 | 9/2010 |
| DE | 102009019384 A1 | 11/2010 |
| DE | 102009035488 A1 | 2/2011 |
| DE | 102009040598 A1 | 3/2011 |
| DE | 102010014484 A1 | 3/2011 |
| DE | 102009043635 A1 | 4/2011 |
| DE | 102010007414 A1 | 8/2011 |
| DE | 102010009063 A1 | 8/2011 |
| DE | 102010012992 A1 | 9/2011 |
| DE | 102010012996 A1 | 9/2011 |
| DE | 102010013025 A1 | 9/2011 |
| DE | 102010028728 A1 | 11/2011 |
| DE | 102011011698 A1 | 8/2012 |
| DE | 102011013182 A1 | 9/2012 |
| DE | 102011016526 A1 | 10/2012 |
| DE | 102011017459 A1 | 10/2012 |
| DE | 102011075820 A1 | 11/2012 |
| DE | 102011103990 A1 | 12/2012 |
| DE | 102011080053 A1 | 1/2013 |
| DE | 102011107007 A1 | 1/2013 |
| DE | 102011109309 A1 | 2/2013 |
| DE | 102011111537 A1 | 2/2013 |
| DE | 102011112598 A1 | 3/2013 |
| DE | 102011086049 A1 | 5/2013 |
| DE | 102011109011 A1 | 5/2013 |
| DE | 102011120010 A1 | 6/2013 |
| DE | 102012000622 A1 | 7/2013 |
| DE | 102012001596 A1 | 8/2013 |
| DE | 102012102657 A1 | 10/2013 |
| DE | 102012103149 A1 | 10/2013 |
| DE | 102013205215 A1 | 10/2013 |
| DE | 102013205323 A1 | 10/2013 |
| DE | 202013104224 U1 | 10/2013 |
| DE | 102012012897 A1 | 1/2014 |
| DE | 102012107548 A1 | 2/2014 |
| DE | 102012219301 A1 | 2/2014 |
| DE | 202012104339 U1 | 2/2014 |
| DE | 102012018057 A1 | 3/2014 |
| DE | 102013200562 A1 | 7/2014 |
| DE | 102013200726 A1 | 7/2014 |
| DE | 102013200786 A1 | 7/2014 |
| DE | 102013203102 A1 | 8/2014 |
| DE | 102013102501 A1 | 9/2014 |
| DE | 102013208996 A1 | 11/2014 |
| DE | 102013215082 A1 | 2/2015 |
| DE | 102013218674 A1 | 3/2015 |
| DE | 102014011609 A1 | 3/2015 |
| DE | 102014217188 A1 | 3/2015 |
| DE | 102013016797 A1 | 4/2015 |
| DE | 102013223357 A1 | 5/2015 |
| DE | 102014100334 A1 | 7/2015 |
| DE | 202015005208 U1 | 8/2015 |
| DE | 102014203715 A1 | 9/2015 |

(56) References Cited

FOREIGN PATENT DOCUMENTS

| | | |
|---|---|---|
| DE | 102014106949 A1 | 11/2015 |
| DE | 202014008335 U1 | 1/2016 |
| DE | 202014008336 U1 | 1/2016 |
| DE | 102014011727 A1 | 2/2016 |
| DE | 102014215164 A1 | 2/2016 |
| DE | 102014112596 A1 | 3/2016 |
| DE | 102014219644 A1 | 3/2016 |
| DE | 102014115051 A1 | 4/2016 |
| DE | 102014221167 A1 | 4/2016 |
| DE | 102014019696 A1 | 6/2016 |
| DE | 102014224545 A1 | 6/2016 |
| DE | 102015015504 A1 | 6/2016 |
| DE | 102015014337 A1 | 7/2016 |
| DE | 102015200636 A1 | 7/2016 |
| DE | 102015204216 A1 | 9/2016 |
| DE | 202016005333 U1 | 9/2016 |
| DE | 102015219558 A1 | 4/2017 |
| DE | 102015222171 A1 | 5/2017 |
| EP | 0705724 A2 | 4/1996 |
| EP | 0779668 A1 | 6/1997 |
| EP | 0780915 A1 | 6/1997 |
| EP | 1939028 A1 | 7/2008 |
| EP | 2298690 A1 | 3/2011 |
| EP | 2374646 A2 | 10/2011 |
| EP | 2388851 A1 | 11/2011 |
| EP | 2456003 A1 | 5/2012 |
| EP | 2467276 A1 | 6/2012 |
| EP | 2554420 A1 | 2/2013 |
| EP | 2562065 A1 | 2/2013 |
| EP | 2565958 A1 | 3/2013 |
| EP | 2581249 A1 | 4/2013 |
| EP | 2620997 A1 | 7/2013 |
| EP | 2626231 A2 | 8/2013 |
| EP | 2626232 A2 | 8/2013 |
| EP | 2626233 A2 | 8/2013 |
| EP | 2741343 A1 | 6/2014 |
| EP | 2758262 A1 | 7/2014 |
| EP | 2833436 A1 | 2/2015 |
| EP | 2913863 A1 | 9/2015 |
| EP | 2944493 A1 | 11/2015 |
| EP | 2990247 A1 | 3/2016 |
| EP | 3379598 A1 | 9/2018 |
| EP | 3382774 A1 | 10/2018 |
| FR | 2661281 A1 | 10/1991 |
| FR | 2705926 A1 | 12/1994 |
| FR | 2774044 A1 | 7/1999 |
| FR | 2782399 A1 | 2/2000 |
| FR | 2861441 A1 | 4/2005 |
| FR | 2948072 A1 | 1/2011 |
| FR | 2949096 A3 | 2/2011 |
| FR | 2959454 A1 | 11/2011 |
| FR | 2961960 A1 | 12/2011 |
| FR | 2962076 A1 | 1/2012 |
| FR | 2975230 A1 | 11/2012 |
| FR | 2976731 A1 | 12/2012 |
| FR | 2982566 A1 | 5/2013 |
| FR | 2986374 A1 | 8/2013 |
| FR | 2986744 A1 | 8/2013 |
| FR | 2986910 A1 | 8/2013 |
| FR | 2986911 A1 | 8/2013 |
| FR | 2987000 A1 | 8/2013 |
| FR | 2987001 A1 | 8/2013 |
| FR | 2988039 A1 | 9/2013 |
| FR | 2990386 A1 | 11/2013 |
| FR | 2993511 A1 | 1/2014 |
| FR | 2994340 A1 | 2/2014 |
| FR | 2996193 A1 | 4/2014 |
| FR | 2998715 A1 | 5/2014 |
| FR | 2999809 A1 | 6/2014 |
| FR | 3000002 A1 | 6/2014 |
| FR | 3002910 A1 | 9/2014 |
| FR | 3007209 A1 | 12/2014 |
| FR | 3014035 A1 | 6/2015 |
| FR | 3019688 A1 | 10/2015 |
| FR | 3022402 A1 | 12/2015 |
| FR | 3028456 A1 | 5/2016 |
| GB | 2081495 A | 2/1982 |
| GB | 2353151 A | 2/2001 |
| GB | 2443272 A | 4/2008 |
| GB | 2483272 A | 3/2012 |
| GB | 2516120 A | 1/2015 |
| JP | H05193366 A | 8/1993 |
| JP | H05201356 A | 8/1993 |
| JP | H08268083 A | 10/1996 |
| JP | H08276752 A | 10/1996 |
| JP | 05193370 | 3/1998 |
| JP | H1075504 A | 3/1998 |
| JP | H10109548 A | 4/1998 |
| JP | H10149805 A | 6/1998 |
| JP | 2774044 B2 | 7/1998 |
| JP | 2819927 B2 | 11/1998 |
| JP | H11178115 A | 7/1999 |
| JP | 2967711 B2 | 10/1999 |
| JP | 2000041303 A | 2/2000 |
| JP | 3085346 B2 | 9/2000 |
| JP | 3199296 B2 | 8/2001 |
| JP | 3284850 B2 | 5/2002 |
| JP | 3284878 B2 | 5/2002 |
| JP | 3286634 B2 | 5/2002 |
| JP | 3489186 B2 | 1/2004 |
| JP | 2004142524 A | 5/2004 |
| JP | 2007331669 A | 12/2007 |
| JP | 2011006050 A | 1/2011 |
| JP | 2011049151 A | 3/2011 |
| JP | 2011152906 A | 8/2011 |
| JP | 2013133044 A | 7/2013 |
| KR | 20120030014 A | 3/2012 |
| KR | 20140007063 A | 1/2014 |
| KR | 101565980 B1 | 11/2015 |
| KR | 101565981 B1 | 11/2015 |
| KR | 20160001976 A | 1/2016 |
| KR | 20160055712 A | 5/2016 |
| KR | 20160087077 A | 7/2016 |
| KR | 101647825 B1 | 8/2016 |
| KR | 20160092902 A | 8/2016 |
| KR | 20160104867 A | 9/2016 |
| KR | 20160111231 A | 9/2016 |
| KR | 20160116383 A | 10/2016 |
| KR | 20170000325 A | 1/2017 |
| KR | 101704496 B1 | 2/2017 |
| KR | 20170052831 A | 5/2017 |
| KR | 20170062845 A | 6/2017 |
| KR | 20170065764 A | 6/2017 |
| KR | 20170065771 A | 6/2017 |
| KR | 20170065854 A | 6/2017 |
| KR | 20170070080 A | 6/2017 |
| KR | 1020170067240 | 6/2017 |
| SE | 507909 C2 | 7/1998 |
| TW | 201425112 A | 7/2014 |
| TW | 1467830 B | 1/2015 |
| TW | I482718 B | 5/2015 |
| WO | 0074964 A1 | 12/2000 |
| WO | 2006100005 A2 | 9/2006 |
| WO | 2006100006 A1 | 9/2006 |
| WO | 2008104356 A1 | 9/2008 |
| WO | 2008104358 A1 | 9/2008 |
| WO | 2008104376 A1 | 9/2008 |
| WO | 2008131935 A2 | 11/2008 |
| WO | 2009080151 A1 | 7/2009 |
| WO | 2009080166 A1 | 7/2009 |
| WO | 2009103462 A1 | 8/2009 |
| WO | 2010004192 A2 | 1/2010 |
| WO | 2010012337 A1 | 2/2010 |
| WO | 2010012338 A1 | 2/2010 |
| WO | 2010012342 A1 | 2/2010 |
| WO | 2010040520 A2 | 4/2010 |
| WO | 2010063365 A1 | 6/2010 |
| WO | 2010069713 A1 | 6/2010 |
| WO | 2010076053 A1 | 7/2010 |
| WO | 2010076055 A1 | 7/2010 |
| WO | 20100796452 | 7/2010 |
| WO | 2011030041 A1 | 3/2011 |
| WO | 2011083980 A2 | 7/2011 |
| WO | 2011106851 A2 | 9/2011 |

(56) References Cited

FOREIGN PATENT DOCUMENTS

| | | |
|---|---|---|
| WO | 2011116801 A1 | 9/2011 |
| WO | 2011116959 A2 | 9/2011 |
| WO | 2011121757 A1 | 10/2011 |
| WO | 2011134815 A1 | 11/2011 |
| WO | 2011134828 A1 | 11/2011 |
| WO | 2012025710 A2 | 3/2012 |
| WO | 2012063025 A2 | 5/2012 |
| WO | 2012065853 A1 | 5/2012 |
| WO | 2012065855 A1 | 5/2012 |
| WO | 2012069349 A1 | 5/2012 |
| WO | 2012084132 A2 | 6/2012 |
| WO | 2012093233 A1 | 7/2012 |
| WO | 2012097514 A1 | 7/2012 |
| WO | 2012114040 A1 | 8/2012 |
| WO | 2012116608 A1 | 9/2012 |
| WO | 2012119424 A1 | 9/2012 |
| WO | 2012163504 A2 | 12/2012 |
| WO | 2013020707 A2 | 2/2013 |
| WO | 2013027982 A2 | 2/2013 |
| WO | 2013042628 A1 | 3/2013 |
| WO | 2013080008 A2 | 6/2013 |
| WO | 2013188680 A1 | 12/2013 |
| WO | 2014114511 A1 | 7/2014 |
| WO | 2014140412 A1 | 9/2014 |
| WO | 2014140463 A1 | 9/2014 |
| WO | 2014183995 A1 | 11/2014 |
| WO | 2014191651 A2 | 12/2014 |
| WO | 2015018658 A1 | 2/2015 |
| WO | 2015043869 A1 | 4/2015 |
| WO | 2015149660 A1 | 10/2015 |
| WO | 2016029084 A1 | 2/2016 |
| WO | 2016046144 A1 | 3/2016 |
| WO | 2016046145 A1 | 3/2016 |
| WO | 2016046146 A1 | 3/2016 |
| WO | 2016046147 A1 | 3/2016 |
| WO | 2016072822 A1 | 5/2016 |
| WO | 2016086274 A1 | 6/2016 |
| WO | 2016106658 A1 | 7/2016 |
| WO | 2016132280 A1 | 8/2016 |
| WO | 2016203130 A1 | 12/2016 |
| WO | 2017025592 A1 | 2/2017 |
| WO | 2017032571 A1 | 3/2017 |
| WO | 2017060608 A1 | 4/2017 |
| WO | 2017084938 A1 | 5/2017 |
| WO | 2017103449 A1 | 6/2017 |
| WO | WO-2018033880 A2 | 2/2018 |
| WO | 2018065554 A1 | 4/2018 |
| WO | 2018149762 A1 | 8/2018 |
| WO | WO-2018213475 A1 | 11/2018 |
| WO | WO-2019055658 A2 | 3/2019 |
| WO | WO-2019-071013 A1 | 4/2019 |

OTHER PUBLICATIONS

International Searching Authority (KR), International Search Report and Written Opinion for International Application No. PCT/IB2017/055002, dated Jul. 19, 2018.

International Searhcing Authority, International Search Report and Written Opinion for Application No. PCT/IB2018/050066, dated Apr. 26, 2018.

Korean Intellectual Property Office (ISA), International Search Report and Written Opinion for International Application No. PCT/US2018/032760, dated Sep. 11, 2018.

Korean Intellectual Property Office (ISA), International Search Report and Written Opinion for International Application No. PCT/US2018/050889, dated Mar. 21, 2019.

Korean Intellectual Propery Office (ISA), International Search Report and Written Opinion for International Application No. PCT/US2018/054423, dated Jan. 28, 2019.

* cited by examiner

POLARIZED BATTERY TRAY FOR A VEHICLE

CROSS-REFERENCE TO RELATED APPLICATIONS

This application claims benefit and priority under 35 U.S.C. § 119(e) of U.S. provisional application Ser. No. 62/506,943, filed May 16, 2017 and U.S. provisional application Ser. No. 62/636,312, filed Feb. 28, 2018, which are hereby incorporated herein by reference in their entireties.

TECHNICAL FIELD

The present disclosure generally relates to vehicle battery trays and structures and associated forming methods, and more particularly to structural components and protective enclosures for concealing and protecting vehicle electronic components and batteries, such as battery packs or modules or the like for electric and hybrid electric vehicles.

BACKGROUND

Electric and hybrid electric vehicles are typically designed to locate and package battery modules on the vehicle in a manner that protects the batteries from damage when driving in various climates and environments, and also that protects the batteries from different types of impacts. It is also fairly common for vehicle frames to locate batteries in a portion of the frame or sub-structure of the vehicle, such as between the axles and near the floor of the vehicle, which can distribute the weight of the batteries across the vehicle frame and establish a low center of gravity for the vehicle.

SUMMARY

The present disclosure provides a battery tray for a vehicle that includes two tray components or pieces that attach or mate together, such as with one tray component over or within the other tray component, to form sealed and separate battery containment areas configured to be spaced longitudinally along the vehicle frame. The lower or outer tray component has a panel portion with elongated reinforcement members integrally formed along opposing edges of the panel portion. Similarly, the upper or inner tray component has a panel portion with cross members integrally extending across the panel portion. The tray components may be separately pultruded or extruded to each have a substantially constant cross-section along the length of the respective elongated reinforcement members and cross members. To attach the tray components together, the upper or inner tray component is rotated approximately ninety degrees to be arranged in a contrasting or polarized manner, with its length generally perpendicular to the length of the lower or outer tray component. In such an arrangement, the panel portion of the lower or outer tray component receives the panel portion of the upper or inner tray component to position the cross members to extend between the elongated reinforcement members and thereby define the separate battery containment areas that are each generally bound on four sides by the cross members and the elongated reinforcement members.

According to one aspect of the present disclosure, a battery tray for a vehicle includes a first tray component that has a first panel portion and elongated reinforcement members integrally coupled at opposing edges of the first panel portion and extending in parallel alignment with each other. Also, a second tray component has a second panel portion and a plurality of cross members integrally extending across the second panel portion. The second panel portion is disposed at an upper surface of the first panel portion with the plurality of cross members extending between the elongated reinforcement members so as to provide a battery containment area between the cross members.

Optionally, the elongated reinforcement members may be formed to provide a multi-tubular shape with at least two elongated hollow cavities extending along lengths of the elongated reinforcement members that are configured to absorb and dissipate side-impact forces at the vehicle. Further, the first and second tray components may each be pultruded as a single integral piece with different materials disposed at different sections of the respective tray component, where the different materials are selected to accommodate the desired performance characteristics of the corresponding section of the tray component.

According to another aspect of the present disclosure, a battery tray for a vehicle includes a tray component that has a panel portion and a pair of elongated reinforcement members integrally protruding upward from opposing edges of the panel portion. A plurality of cross members are disposed at an upper surface of the panel portion, with the plurality of cross members extending between the elongated reinforcement members and defining a battery containment area between each of the plurality of cross members.

According to yet another aspect of the present disclosure, a battery tray for a vehicle includes a tray component that has a panel portion and a plurality of cross members integrally extending upward from and across the panel portion. A pair of elongated reinforcement members are attached at opposing edges of the tray component. An inside surface of each of the pair of elongated reinforcement members engage at one of the opposing ends of the plurality of cross members and at the panel portion to define a battery containment area between each of the plurality of cross members.

According to another aspect of the present disclosure, a battery tray for a vehicle includes an outer tray component that has a lower panel portion and elongated reinforcement members integrally protruding upward from opposing edges of the lower panel portion. An inner tray component has an upper panel portion and a plurality of cross members integrally extending upward and across the upper panel portion. The upper panel portion of the inner tray component is disposed over the lower panel portion of the lower tray component, such that opposing ends of the plurality of cross members engage inside surfaces of the elongated reinforcement members to define a battery containment area between each of the plurality of cross members.

According to yet another aspect of the present disclosure, a method of forming a battery tray for a vehicle includes forming outer and inner tray components, such as via a pultrusion or extrusion process. The outer tray component is formed to have a lower panel portion and elongated reinforcement members integrally protruding upward from opposing edges of the lower panel portion along a length of the outer tray component, where the outer tray component has a consistent cross-sectional shape along its length. The inner tray component is formed to have an upper panel portion and a plurality of cross members integrally extending upward from the upper panel portion along a length of the inner tray component, where the inner tray component also has a consistent cross-sectional shape along its length. The upper panel portion of the inner tray component is disposed over the lower panel portion of the lower tray component, such that the plurality of cross members extend between and generally perpendicular to the elongated reinforcement members to define a battery containment area between each of the plurality of cross members. Optionally, such as when pultruding the outer and/or inner tray components, different materials may be disposed at different sections of the respective tray component, such as carbon fiber disposed at the elongated reinforcement members or cross members and aramid or glass disposed at the upper or lower panel portions.

These and other objects, advantages, purposes, and features of the present disclosure will become apparent upon review of the following specification in conjunction with the drawings.

BRIEF DESCRIPTION OF THE DRAWINGS

FIG. 128 is an upper perspective view of the upper or inner tray component shown in FIG. 12A, illustrating an axis and direction of rotation for positioning the tray component prior to assembly with the lower or outer tray component;

DETAILED DESCRIPTION

Figure 1:
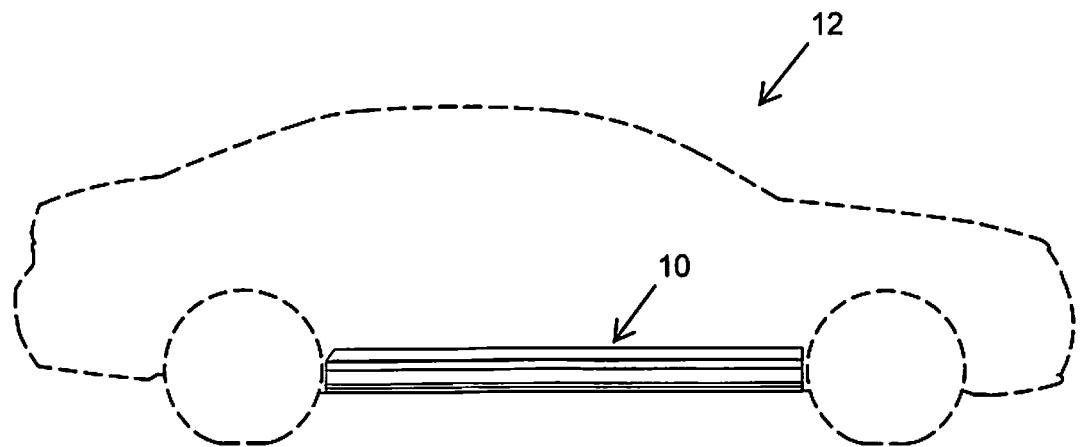
FIG. 1 is a side elevation view of a battery tray at a mounting location on a vehicle in accordance with the present disclosure.
Figure 2:
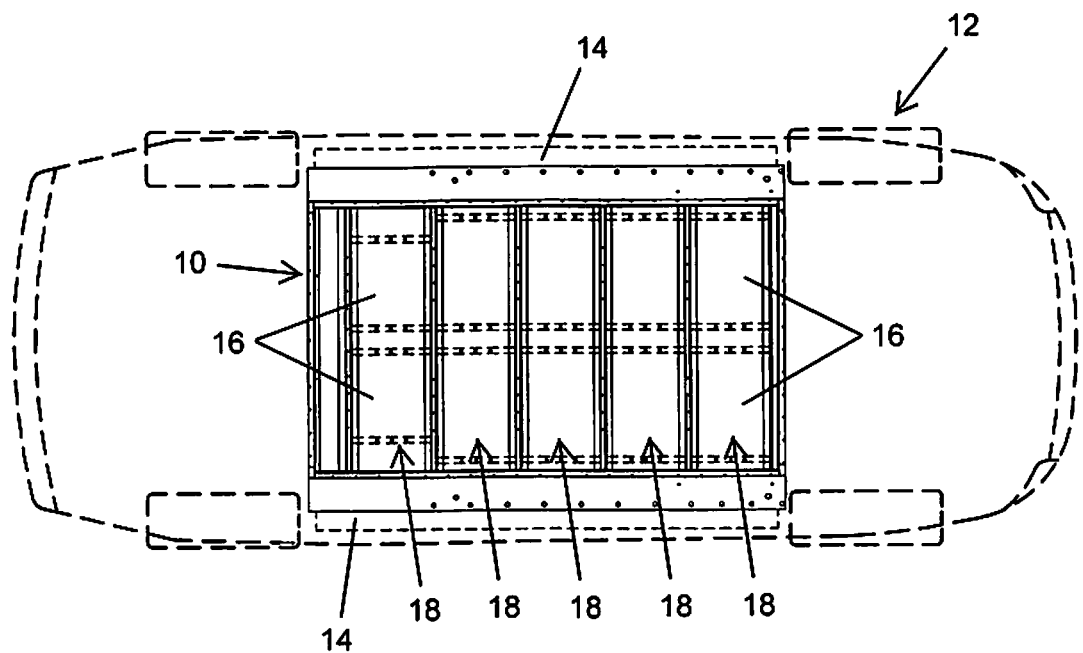
FIG. 2 is a top plan view of the battery tray and outline of the vehicle shown in FIG. 1, illustrating rocker rails of the vehicle and battery modules held in the battery tray in dashed lines.
Figure 8:
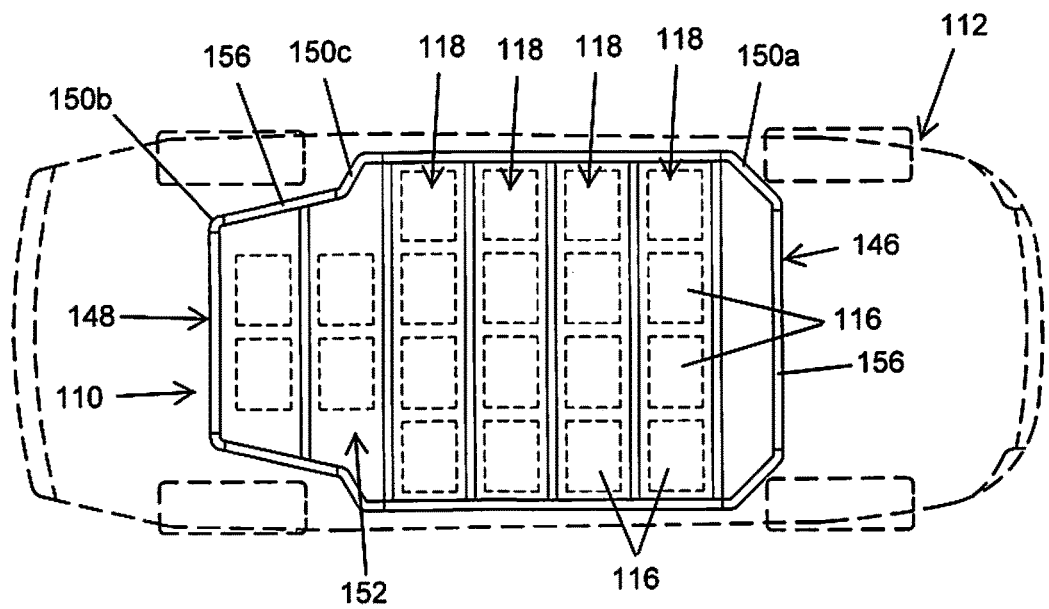
FIG. 8 is a top plan view of a vehicle having a battery tray, showing battery modules held in the battery tray in dashed lines.

Referring now to the drawings and the illustrative embodiments depicted therein, a vehicle battery support structure or tray 10, 110, 210 is provided for supporting and protecting battery packs or modules or the like, such as for an electric or hybrid-electric vehicle 12, 112, such as shown in FIGS. 1 and 8. The battery tray 10 may be attached or mounted to the vehicle frame, such as at or near the lower frame or rocker rails 14 of the vehicle 12. This mounting location of the battery tray 10 positions the battery modules 16 contained within the support tray 10 in a generally central location on the vehicle 12, away from probable impact locations, and also in a location that evenly distributes the weight of the battery modules 16 and provides the vehicle with a relatively low center of gravity. It is contemplated that the battery tray 10 may be disengaged or detached from the rocker rails 14 of the vehicle 12, such as for replacing or performing maintenance on the battery modules 16 or related electrical components. To facilitate this optional disengagement or detachment, the battery tray 10 can be a modular design with standardized mounting locations capable of disengagement, such as with bolts or releasable fasteners or the like. Accordingly, the illustrated battery tray 10 may span below the vehicle with a generally thin profile, so as to accommodate various vehicle body types and designs.

Figure 3:
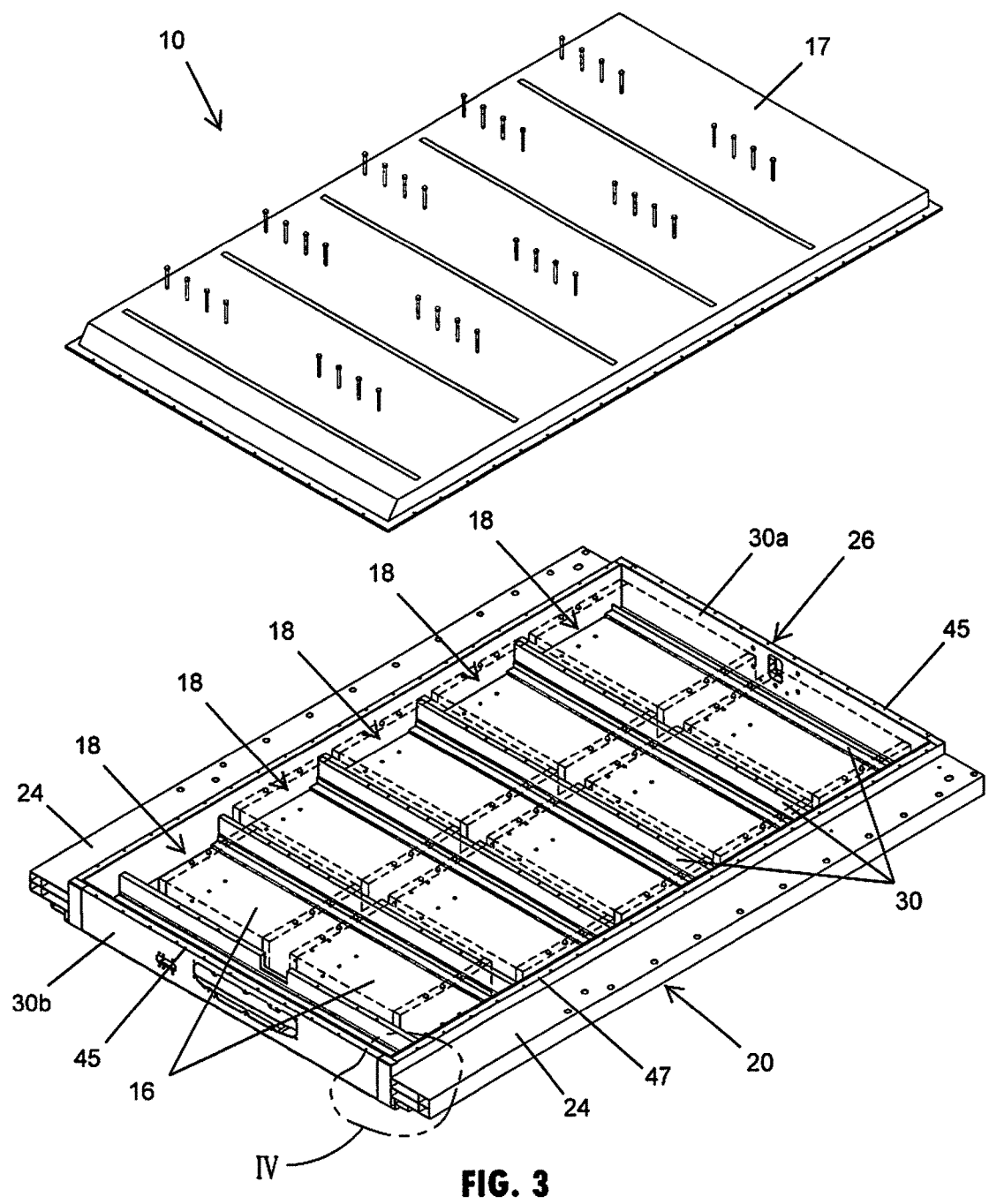
FIG. 3 is an exploded, upper perspective view of the battery tray shown in FIG. 1, showing the cover removed and the battery tray separate from a vehicle.
Figure 4:
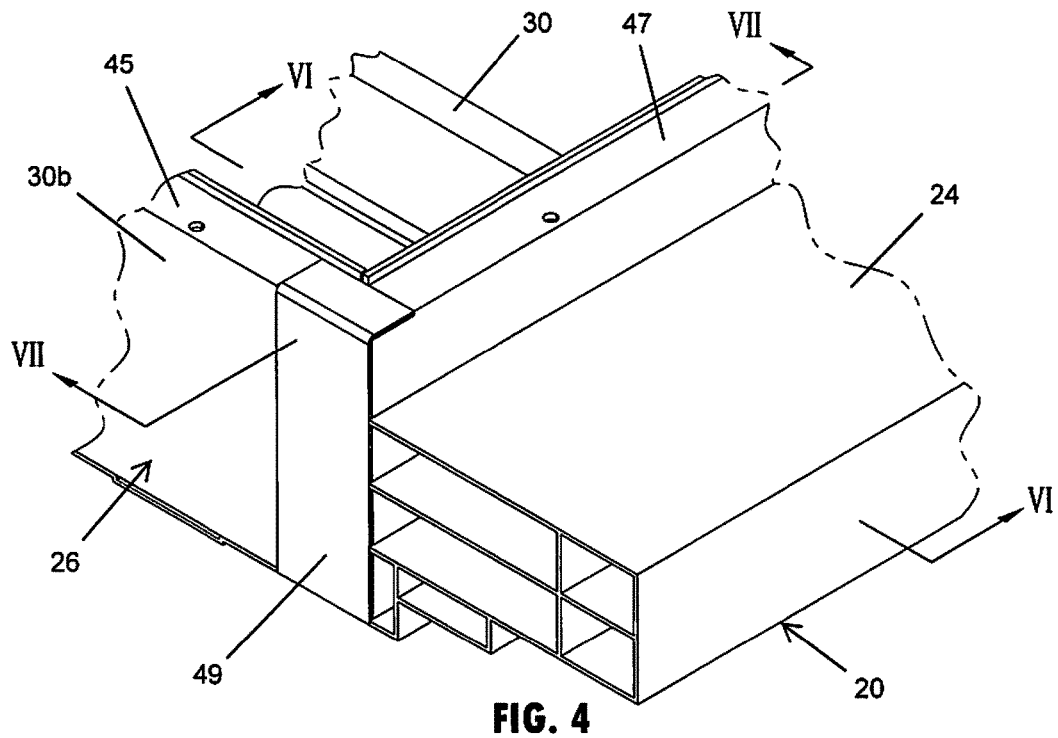
FIG. 4 is an enlarged upper perspective view of a corner portion of the battery tray shown in FIG. 3, taken at section IV.
Figure 5:
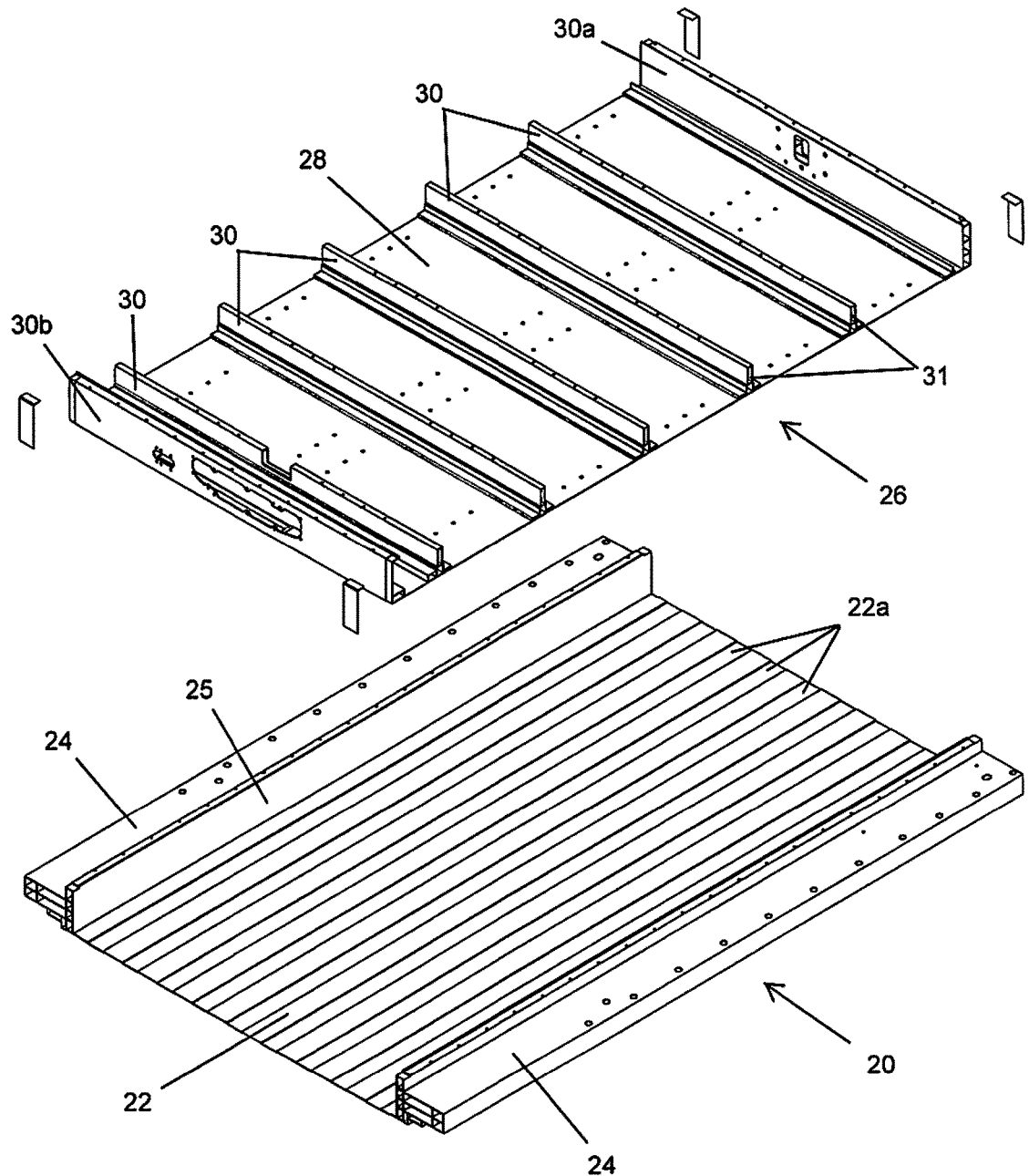
FIG. 5 is an exploded, upper perspective view of the battery tray shown in FIG. 3, showing the tray components exploded away from each other.

With reference to the embodiment shown in FIGS. 1-7, the battery tray 10 may include at least two tray components or pieces that attach or mate together, such as with one tray component over or within another tray component, to form sealed and separate battery containment areas 18 configured to be spaced longitudinally along the vehicle frame. A lower or outer tray component 20, such as shown in FIG. 5, may have a panel portion 22 with elongated reinforcement members 24 integrally formed along opposing edges of the panel portion 22. Similarly, an upper or inner tray component 26, as shown in FIG. 3, may have a panel portion 28 with cross members 30 integrally extending across the panel portion 28. The outer and inner tray components 20, 26 may be separately pultruded or extruded to have a substantially constant cross-section along the length of the respective elongated reinforcement members 24 and cross members 30. The inner and outer tray components 26, 20 may each be pultruded as a single integral piece, such as with different materials disposed at different sections of the respective tray component. As further discussed below, these different pultruded materials may be selected to accommodate the desired performance characteristics or cost considerations of the respective section of the tray component.

To attach the outer and inner tray components 20, 26 together, the upper or inner tray component 26 may be rotated approximately ninety degrees about a vertical or upright axis to be arranged in a contrasting or polarized manner relative to the lower or outer tray component 20, such as with the lengths defined by the directions of formation being generally perpendicular to each other. In this arrangement, the panel portion 22 of the lower or outer tray component 20 may receive the panel portion 28 of the upper or inner tray component 26 so that the cross members 30 may extend between the elongated reinforcement members 24 and thereby provide the peripheral walls that surround the separate battery containment areas 18, such as shown in FIG. 3. As such, the battery containment areas 18 may each be generally bound on four sides by the cross members 30 and the elongated reinforcement members 24, and bound at the bottom by the panel portion 28 of the upper or inner tray component 26.

It is contemplated that, alternatively, the upper and lower tray components may be rotated, such as to provide longitudinally extending battery containment areas, or may be reversed, such as to provide the upper component with the longitudinal side members and the lower component with the cross members. Also, optionally, either the upper or lower tray components may be provided without a panel portion, such that the tray may alternatively be formed with an upper component having cross members integrally formed with the panel portion and longitudinally extending reinforcement members attached separately along edges of the panel portion, such as at the ends of the cross members, such as with protrusions that extend laterally from the longitudinal reinforcement members that matably engage in the cross members to form a similarly sized tray component to that illustrated in FIG. 3. Further, the battery tray may alternatively be formed with a lower component having longitudinally extending reinforcement members integrally formed with a panel portion and individual cross members attached separately along the upper surface of the panel portion with ends of the cross members attaching at the inside surfaces of the longitudinally extending reinforcement members, such as to form a similarly sized tray component to that illustrated in FIG. 3.

As shown in FIG. 5, the outer tray component 20 has the elongated reinforcement members 24 extending upward from opposing longitudinal edges of the panel portion 22. Each reinforcement member 24 is formed to provide a multi-tubular shape with at least one, and more preferably with at least two, elongated hollow cavities 34 extending along a length of each of the elongated reinforcement members 24. The elongated cavities 34 both reduce mass and are configured to absorb and dissipate side-impact forces imparted at the vehicle. The illustrated cavities provide two generally square-shaped tubular shapes arranged with one disposed over the other, where these square-shaped tubes share a common walls that is arranged horizontally to divide the square-shaped cavities. The illustrated reinforcement member 24 also includes a additional cavities 34 provided along an outer tube 38 so as to share a common wall 40 that is vertically oriented to divide these laterally adjacent cavities. The outer tray component 20 also has a panel portion 22 that spans generally horizontally and laterally between the longitudinally extending reinforcement members 24. The panel portion 22, as shown in FIG. 5, may include longitudinal ribs 22a that are formed to stiffen the length of the panel portion 22 and improve lower impact absorption. The ribs may be indented channels formed along the length of the panel portion, such as shown at stiffening ribs 22a in FIG. 5A, and also or alternatively may be different types of stiffening features disposed along the length of the panel portion, such as thickened portions of material or elongated cavities.

Figure 5A:
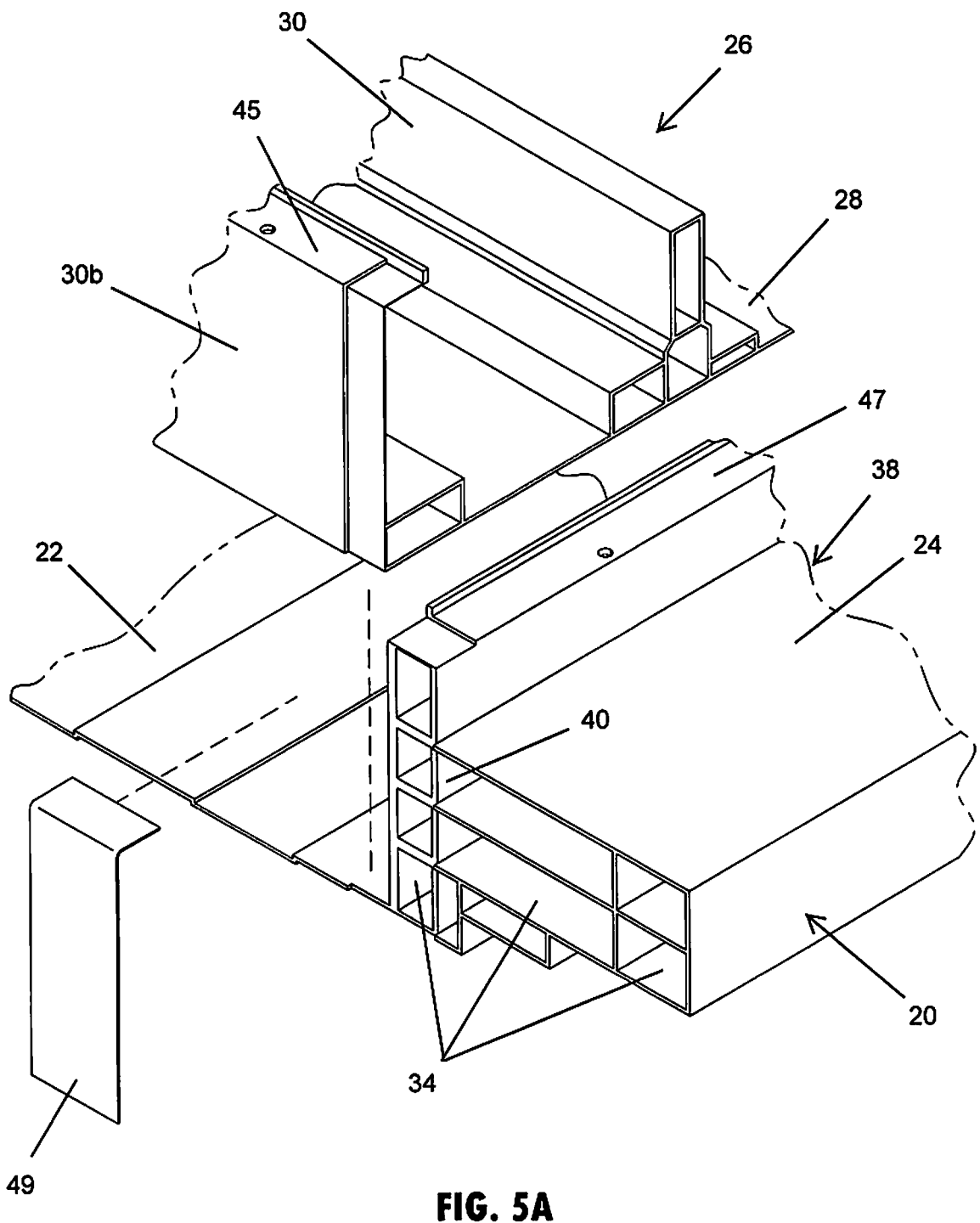
FIG. 5A is an exploded, upper perspective view of a corner portion of the battery tray shown in FIG. 5.
Figure 6:
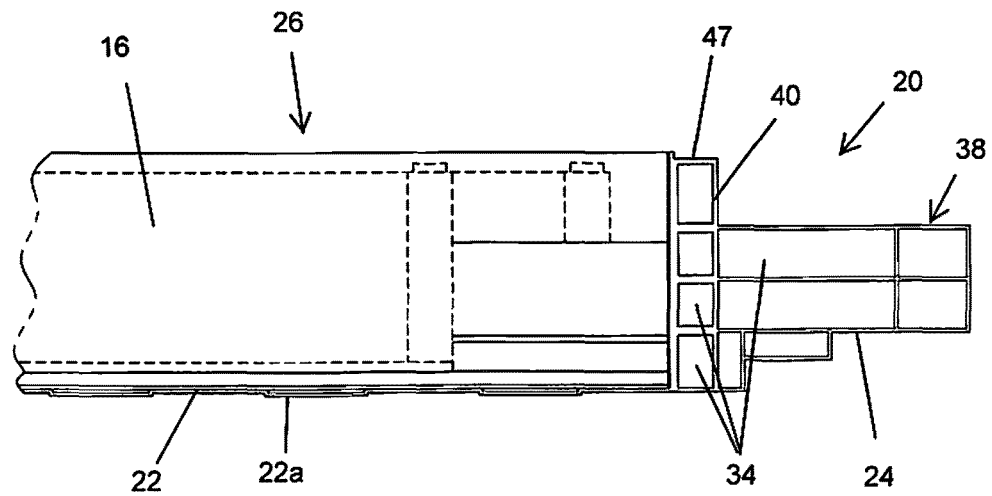
FIG. 6 is a cross-sectional view of the battery tray shown in FIG. 4, taken at line VI-VI, showing the consistent cross-sectional shape of the side reinforcement members.
Figure 7:
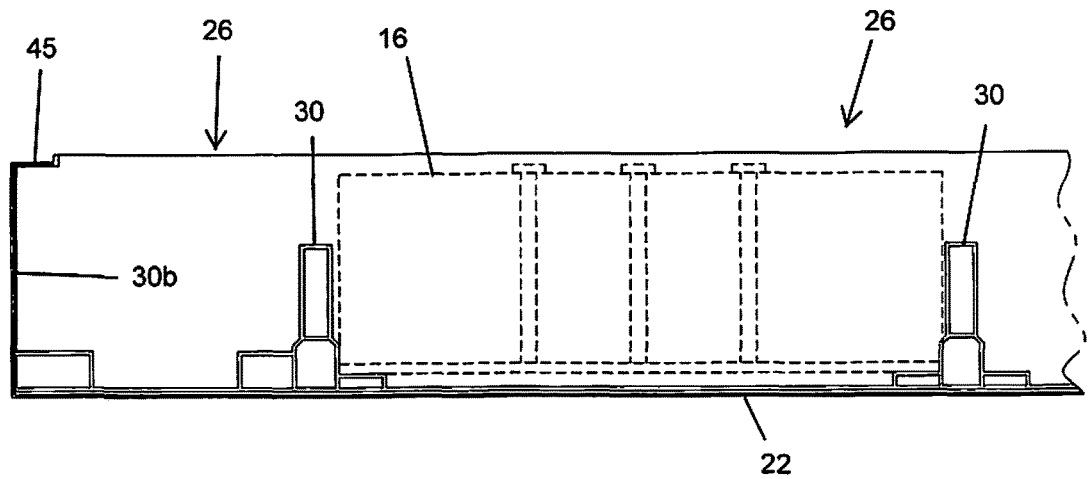
FIG. 7 is a cross section view of the battery tray shown in FIG. 4, taken at line VII-VII, showing a battery module in dashed lines.

With respect to the upper or inner tray component 26, the illustrated cross members 30 integrally protrude upward from the panel portion 28 and extend across the panel portion 28 in substantially parallel alignment relative to each other, such as shown in FIG. 5. The cross members 30 are spaced apart from each other to divide the corresponding battery containment areas 18 in desirable sizes, such as in generally equal spacing for providing similarly sized battery modules 16 between the cross members 30, such as shown in FIG. 3. It is conceivable that the spacing between the cross members may also be unequal to accommodate differently sized battery modules. The illustrated cross members 30, such as shown in FIG. 5A, also have hollow interior cavities 42 for weight reduction and/or to provide packaging space, such as for wires or cooling lines or the like. Further, the cross members 30 have inward protruding channels 44 at the side surfaces that extend along each cross member, which may function to stiffen the cross members, provide an attachment or packaging space for cooling lines or wire, and/or to provide a slot for securing a battery support or anchoring bracket.

The inner tray component 26 also has a panel portion 28 that spans generally horizontally and longitudinally between each of the cross members 30. The panel portion 28 of the inner tray component 26 is substantially flat, although it is conceivable that it may include stiffening ribs or channels formed laterally across the panel portion or may include other features, such as thickened portions of material or elongated cavities.

When assembling the battery tray 10, the inner tray component 26 is disposed over and in the outer tray component 20, such that the panel portion 28 of the inner tray component 26 is laid over and generally against the panel portion 22 of the lower tray component 20. In doing so, the cross members 30 extend between and substantially perpendicularly relative to the elongated reinforcement members 24, such that opposing ends 31 of the cross members 30 engage inside surfaces of the elongated reinforcement members 24. The cross members 30 extend between and generally perpendicular to the elongated reinforcement members 24 to define a battery containment area 18 between each of the plurality of cross members.

Figure 4A:
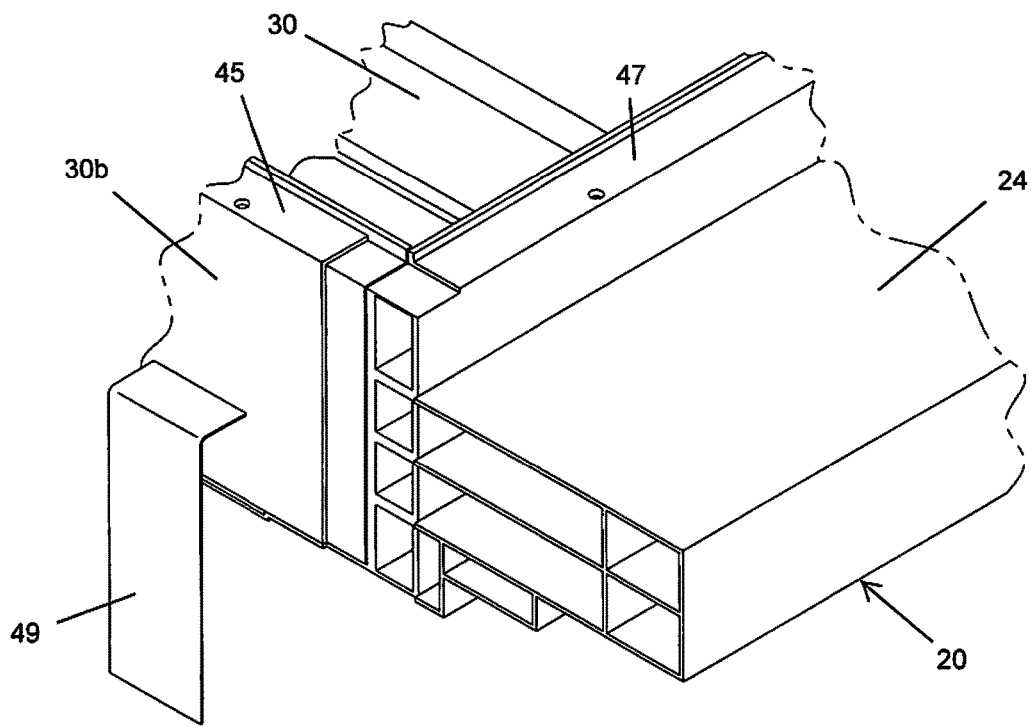
FIG. 4A is an exploded, upper perspective view of the battery tray shown in FIG. 4, showing a healing element exploded away from the tray components.

To generally seal the battery containment areas 18, a seal 41 may be provided between the inner surfaces 25 of the elongated reinforcement members 24 and the cross members of the inner tray component 26, such as at the corners between the substantially flat outer surfaces of the front and rear cross members 30a, 30b and the elongated reinforcement members 24. Thus, the design of the battery tray 10 may have a substantially watertight seal by only sealing these four seams at the corners of the tray. The front and rear cross members 30a, 30b also include a flange 45 (FIG. 3)

that protrudes forward and rearward, respectively, so as to provide an upper surface that is substantially coplanar with the upper surfaces 47 of the elongated reinforcement members 24, such as shown in FIG. 4. These upper surfaces may thereby form a continuous upper rim that may engage or attached to a cover panel 17, such as shown in FIG. 3, so as to seal the upper opening of the interior of the battery tray 10. Further, as shown in FIGS. 4 and 4A, an healing element 49 may be disposed at the corner portion of the battery tray 10 to fill the end cutout formed at the flange 45 and the upper surface 47, thereby making the upper rim surface flush about the perimeter of the battery tray 10. Such a healing element 49 may also be used to at least partially enclose the end openings of the elongated reinforcement members 24 and cover the outer seam between the tray components 20, 26. Optionally, the interfacing surfaces of the panel portions 22, 28 may also be bonded or sealed together, such as with a heat treatment or an adhesive or the like. However, it is understood that such sealed battery containment areas 18 may be vented for accommodating battery swelling or contraction, such as at a vented opening that is difficult for water or liquid or debris to enter, such as by locating the vented opening at an upper portion or interior portion of the battery tray or by providing the vented opening with a membrane or fabric cover that is air permeable and liquid impermeable to provide the desired liquid sealed environment for storing the batteries or electrical equipment or other vehicle-related item in the battery tray.

Figure 9:
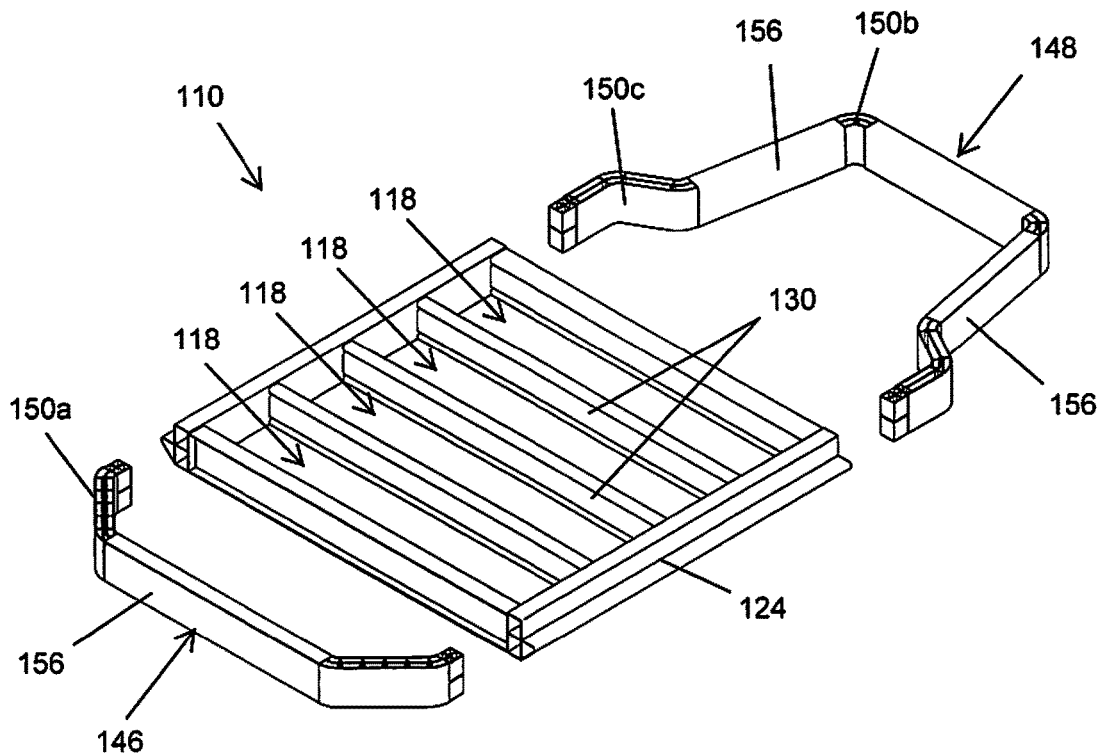
FIG. 9 is an exploded, upper perspective view of the battery tray shown in FIG. 8.
Figure 10:
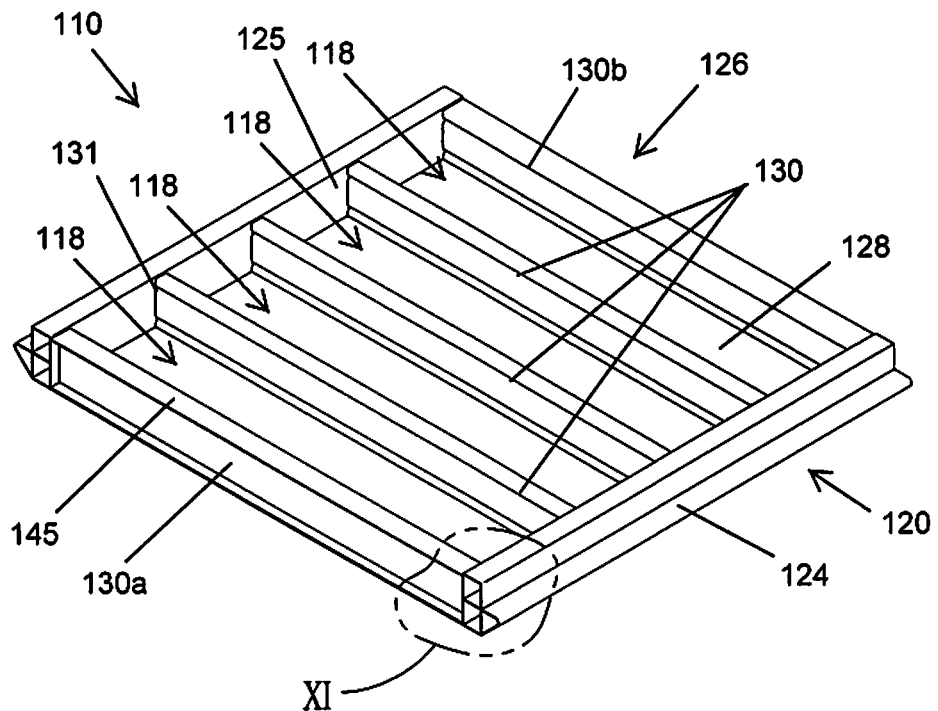
FIG. 10 is an upper perspective view of the battery tray shown in FIG. 8.

With reference to the embodiment shown in FIGS. 8-17, the battery tray 110 includes at least two tray components or pieces that attach or mate together, such as with one tray component over or within another tray component, to form sealed and separate battery containment areas 118 configured to be spaced longitudinally along the vehicle frame. A lower or outer tray component 120, such as shown in FIG. 10, may have a panel portion 122 with elongated reinforcement members 124 integrally formed along opposing edges of the panel portion 122. Similarly, an upper or inner tray component 126, as shown in FIG. 10, may have a panel portion 128 with cross members 130 integrally extending across the panel portion 128. The outer and inner tray components 120, 126 may be separately pultruded or extruded to have a substantially constant cross-section along the length of the respective elongated reinforcement members 124 and cross members 130. The inner and outer tray components 126, 120 may each be pultruded as a single integral piece, such as with different materials disposed at different sections of the respective tray component. As further discussed below, these different pultruded materials may be selected to accommodate the desired performance characteristics of the respective section of the tray component.

Figure 12:
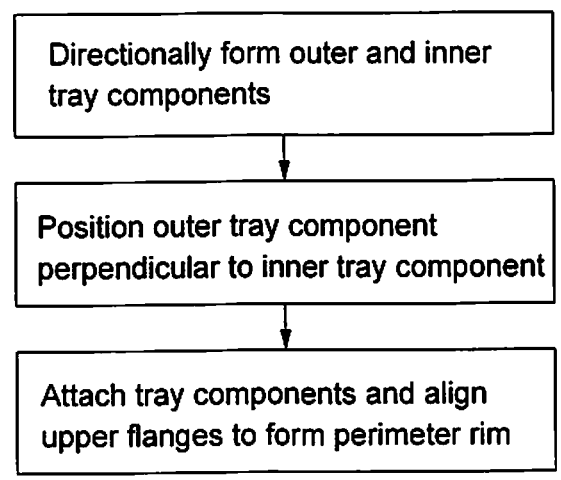
FIG. 12 is a flow chart of a process for forming a battery tray.
Figure 12A:
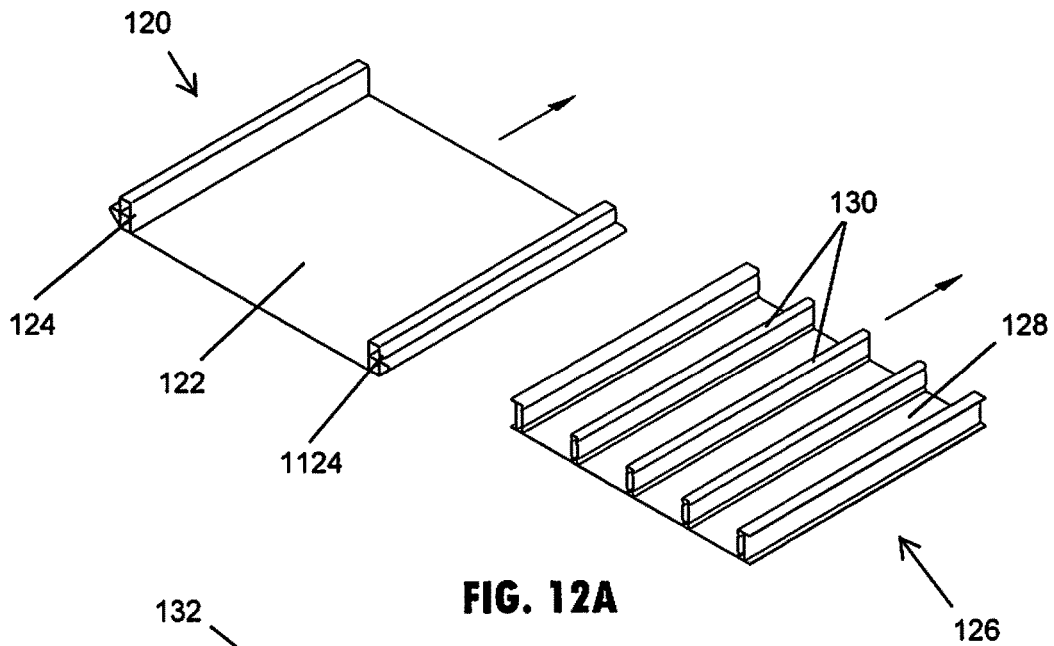
FIG. 12A is an upper perspective view of the tray components of the battery tray shown in FIG. 10, illustrating the tray components side-by-side and oriented in their respective directions of formation.
Figure 12B:
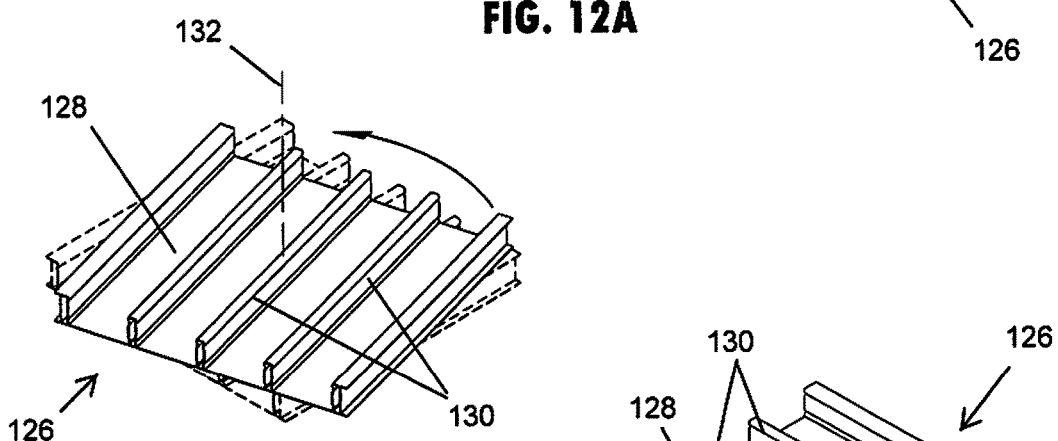
FIG. 12C is an upper perspective view of the upper and lower tray components vertically separated and positioned with the directions of formation substantially perpendicular relative to each other prior to attachment.
Figure 12C:
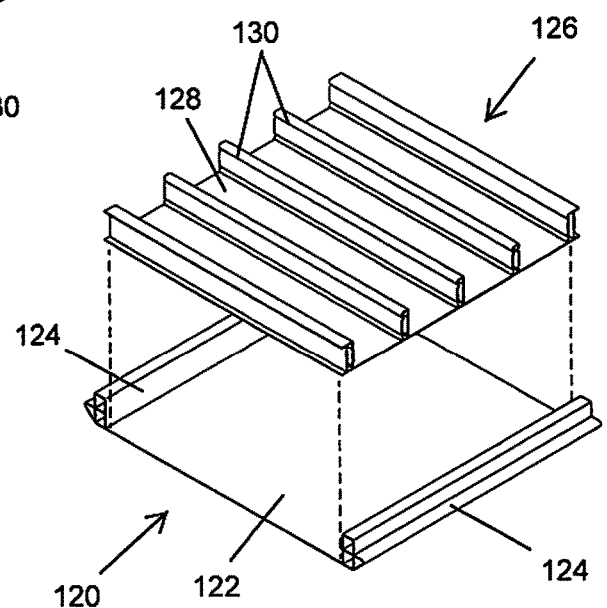

As shown in FIGS. 12A-12C, to attach the outer and inner tray components 120, 126 together, the upper or inner tray component 126 may be rotated approximately ninety degrees about a vertical or upright axis 132 to be arranged in a contrasting or polarized manner relative to the other tray component, such as with its length generally perpendicular to the length of the lower or outer tray component 120. In this arrangement, the panel portion 122 of the lower or outer tray component 120 receives the panel portion 128 of the upper or inner tray component 126 to position the cross members 130 to extend between the elongated reinforcement members 124 and thereby define the separate battery containment areas 118 (FIG. 10) that are each generally bound on four sides by the cross members 130 and the elongated reinforcement members 124.

It is contemplated that, alternatively, the upper and lower tray components may be rotated, such as to provide longitudinally extending battery containment areas, or may be reversed, such as to provide the upper component with the longitudinal side members and the lower component with the cross members. Also, optionally, either the upper or lower tray components may be provided without a panel portion, such that the tray may alternatively be formed with an upper component having cross members integrally formed with the panel portion and longitudinally extending reinforcement members attached separately along edges of the panel portion, such as at the ends of the cross members, such as with protrusions that extend laterally from the longitudinal reinforcement members that matably engage in the cross members to form a similarly sized tray component to that illustrated herein. Further, the battery tray may alternatively be formed with a lower component having longitudinally extending reinforcement members integrally formed with a panel portion and individual cross members attached separately along the upper surface of the panel portion with ends of the cross members attaching at the inside surfaces of the longitudinally extending reinforcement members, such as to form a similarly sized tray component to that illustrated in herein.

Figure 11:
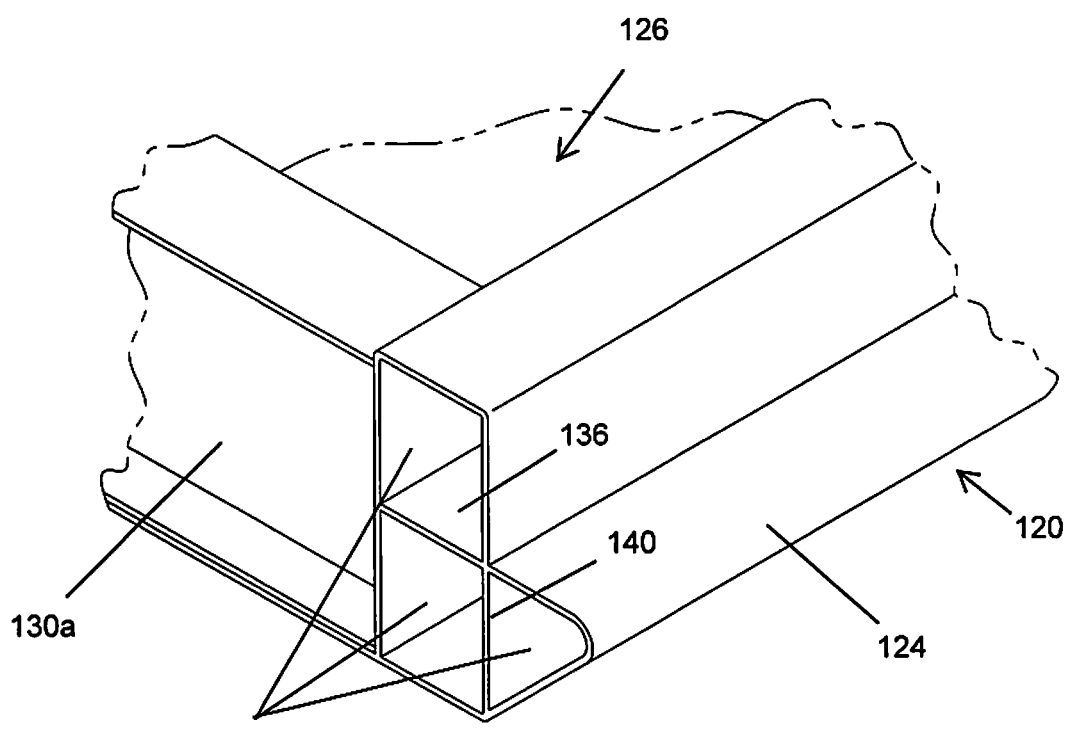
FIG. 11 an enlarged, upper perspective view of a corner portion of the battery tray shown in FIG. 10, taken at section XI.

As shown in FIG. 11, the outer tray component 120 has the elongated reinforcement members 124 extending upward from opposing longitudinal edges of the panel portion 122. Each reinforcement member 124 is formed to provide a multi-tubular shape with at least one, and more preferably with at least two, elongated hollow cavities 134 extending along a length of each of the elongated reinforcement members 124. The elongated cavities 34 both reduce mass and are configured to absorb and dissipate side-impact forces imparted at the vehicle. The illustrated cavities provide two generally square-shaped tubular shapes arranged with one disposed over the other, where these square-shaped tubes share a common wall 136 that is arranged horizontally to divide the square-shaped cavities. The illustrated reinforcement member 124 also includes a third cavity 134 provided along an outer tube 138 that has a generally triangular-shaped cross section and that is arranged laterally outside the lower tube, so as to share a common wall 140 that is vertically oriented to divide these laterally adjacent cavities.

With respect to the upper or inner tray component 126, the illustrated cross members 130 integrally protrude upward from the panel portion 128 and extend across the panel portion 128 in substantially parallel alignment relative to each other, such as shown in FIG. 10. The cross members 130 are spaced apart from each other to divide the corresponding battery containment areas 118 in desirable sizes, such as in generally equal spacing for providing similarly sized battery modules 116 between the cross members 130 (FIG. 8). It is conceivable that the spacing between the cross members may also be unequal to accommodate differently sized battery modules. The illustrated cross members 130, such as shown in FIG. 9, also have hollow interior cavities 142 for weight reduction and/or to provide packaging space, such as for wires or cooling lines or the like. Further, the cross members 130 have inward protruding channels 144 at the side surfaces that extend along each cross member, which may function to stiffen the cross members, provide an attachment or packaging space for cooling lines or wire, and/or to provide a slot for securing a battery support or anchoring bracket.

The inner tray component 126 also has a panel portion 128 that spans generally horizontally and longitudinally between each of the cross members 130. The panel portion 128 of the inner tray component 126 is substantially flat, although it is conceivable that it may include stiffening ribs or channels formed laterally across the panel portion or may include other features, such as thickened portions of material or elongated cavities. Features of the battery tray 110 that are similar to the battery tray 10 are not described in detail again, and similar reference numbers are used, incremented by 100.

Referring again to FIGS. 8 and 9, the battery tray 110 may include additional tray components, such as to extend the tray longitudinally by adding a front section 146 and/or a rear section 148 to the assembled outer and inner tray components 120, 126. These added front or rear sections 146, 148 can be utilized for additional desired battery containment storage and/or to provide additional reinforcement structure to the battery tray, such as to protect against intrusion from impacts. Specifically, the illustrated outer and inner tray components 120, 126 are assembled to form a generally square or rectangular shaped outer frame, as shown in FIG. 9, which has the front section 146 modularly added or attached to the front end of the assembled outer and inner tray components 120, 126 to provide front impact and intrusion protection. Similarly, the illustrated rear section 148 is added or attached to the rear end of the assembled outer and inner tray components 120, 126 to provide additional battery containment areas between the rear wheels of the vehicle.

Figure 13:
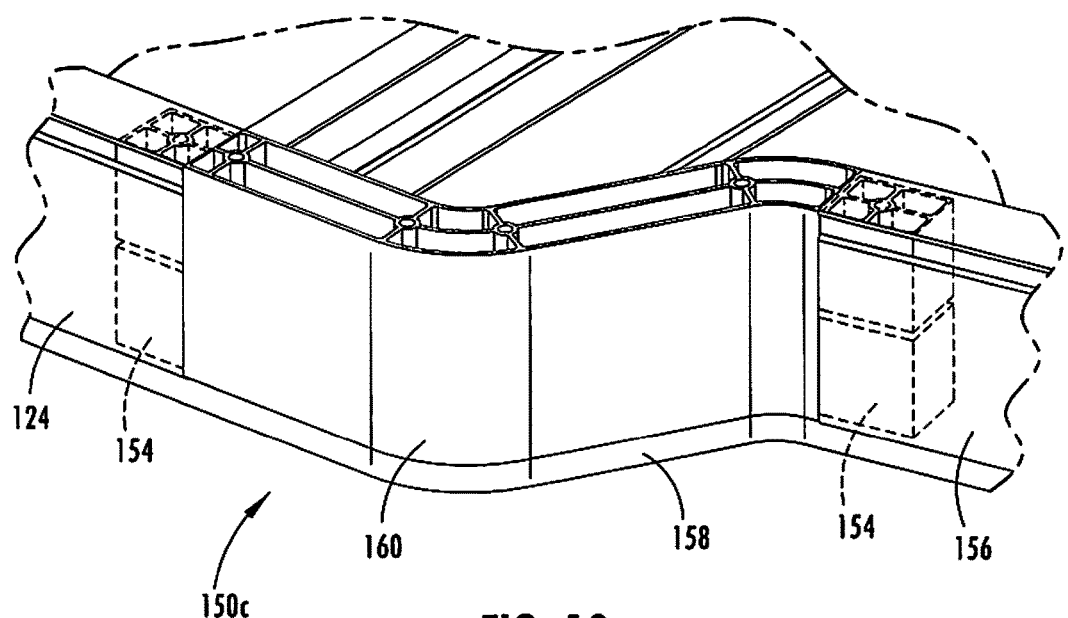
FIG. 13 is an enlarged, upper perspective view of a section of the battery tray shown in FIG. 8, illustrating a module node attached at the battery tray.
Figure 14:
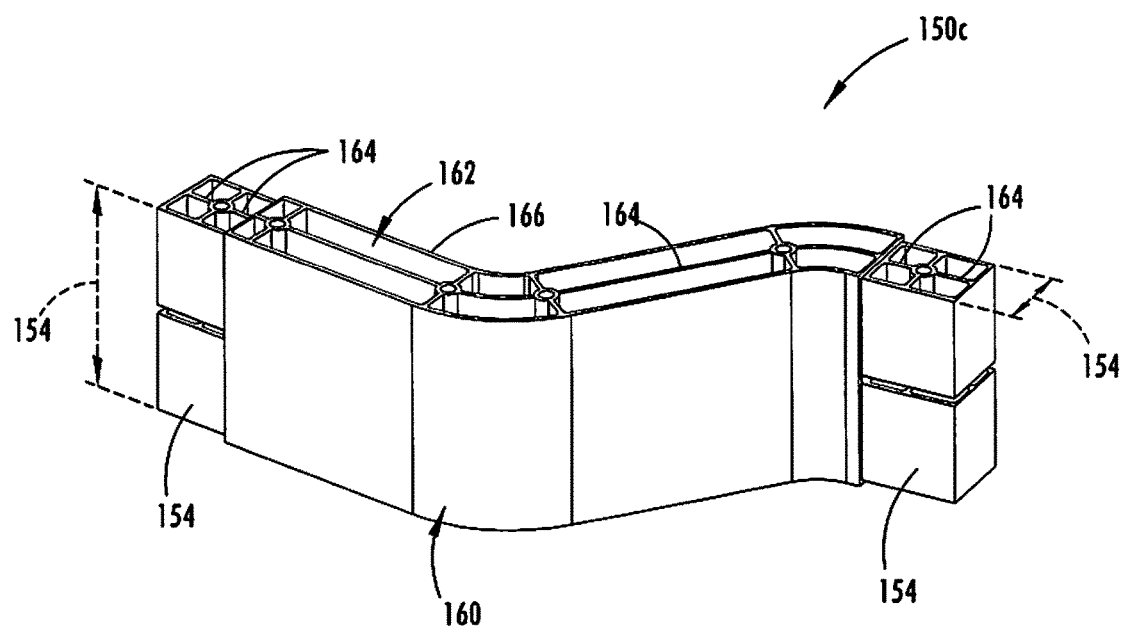
FIG. 14 is an upper perspective view of the module node shown in FIG. 13.
Figure 15:
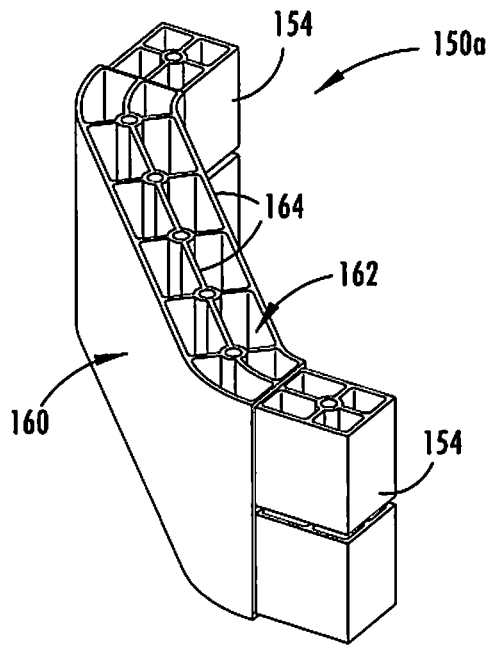
FIG. 15 is an upper perspective view of a front corner module node of the battery tray shown in FIG. 8.
Figure 16:
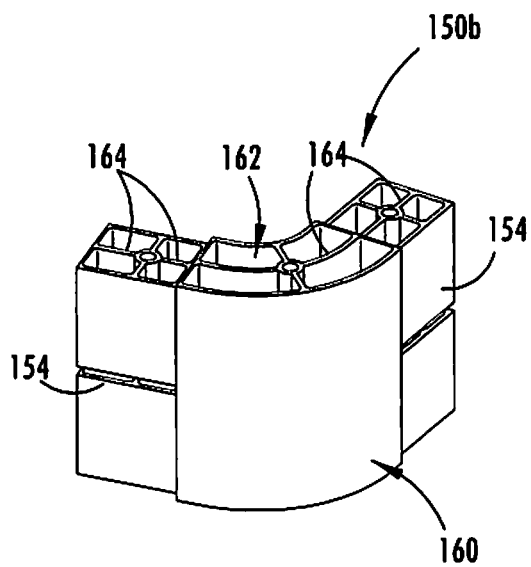
FIG. 16 is an upper perspective view of a rear corner module node of the battery tray shown in FIG. 8.
Figure 17:
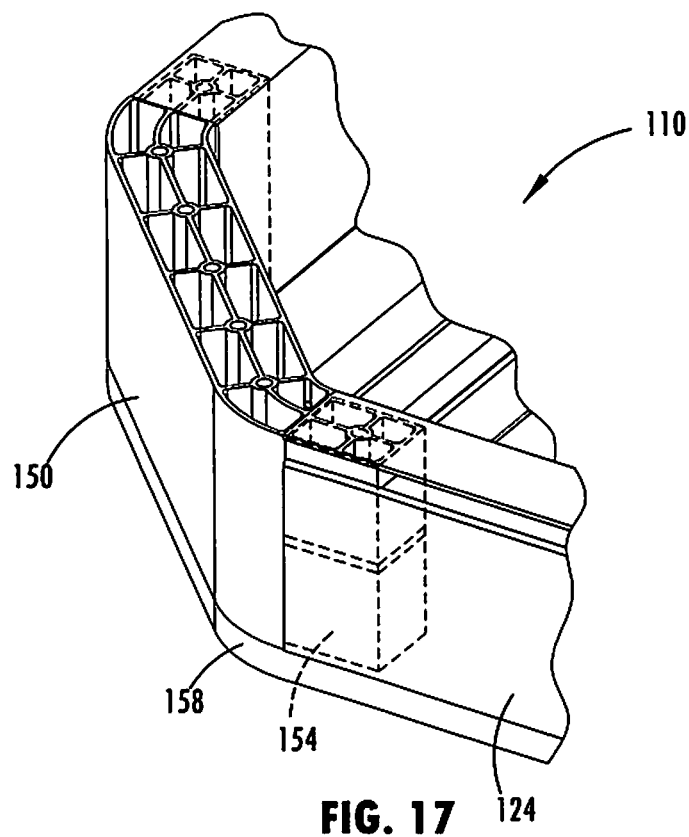
FIG. 17 is an enlarged, upper perspective view of a section of the battery tray shown in FIG. 8, illustrating the front corner module node attached at the battery tray.

These front and rear sections 146, 148 may be attached with modular nodes 150, such as done with the nodes 150a-150c shown in greater detail in FIGS. 13-17. The rear nodes 150c (FIG. 16) may be attached at the rear ends of the elongated reinforcement members 124 for engaging such a rear modular structure that has an additional battery containment area 152. As shown in FIG. 13, an engagement portion 154 of the node 150 is inserted into the open ends of the hollow cavities. The nodes 150 may be standardized in shape and size and may be located at selected location, such as at corners or wheel well transitions, whereby the nodes may be used to select or alter the size and shape of the front and rear tray sections to provide or modify the overall shape of the battery tray 110. The illustrated nodes are shaped to provide front corner nodes 150a, rear corner nodes 150b, and wheel well transition nodes 150c that fit the general undercarriage design of several vehicle types and designs. Such a standardized node design allows generally straight reinforcement members 156 to be cut to the length for accommodating the desired size and shape of the added front or rear section 146, 148 of the battery tray 110, without having to otherwise account for different types of bends or sweeps of the elongated reinforcement members 156.

The attached nodes 150a-150c, such as shown in FIGS. 8 and 9, engage additional reinforcement members form a containment wall that generally surrounds the additional battery containment area of the additional tray component. The nodes 150 and reinforcement members 156 of each additional tray component may be sealed together with a base plate 158 (FIG. 13) to provide a bottom surface for each additional section of the battery tray 110, such as to support battery modules and related components and to a sealed lower surface to prevent unwanted gases and fluids from entering or exiting the additional battery containment area. Further, such nodal attachment also allows the additional reinforcement members 156 to be formed from various materials, such as a steel that is roll formed into a beam or an aluminum extrusion or a composite material or the like. To engage the end of a node 150, the common center wall 136 (FIG. 11) of the elongated reinforcement members 124 may be trimmed away at select distance into the elongated hollow cavities 134 at the ends to provide an open rectangular trimmed away area sized for engaging the node 150. In an additional embodiment, the ends of the nodes 150 may include a horizontal slot to receive the common center wall of the elongated reinforcement members when attaching the node modules. Other cross-sectional shapes may also conceivably be incorporated into one or more of the additional reinforcement members 156 or reinforcement members 124, along with cross-sectional shapes that may be formed by extrusion or pultrusion or other forming methods. Accordingly, the ends of the nodes 150 may have a corresponding attachment interface.

The intermediate portion 160 of the node 150 may include a formed shape or curvature, such as shown in FIGS. 13-17 by the various shapes provided by the corner nodes 150a, 150b and the wheel well transition nodes 150c. The intermediate portions 160 of the corner nodes 150a, 150b, each include curvature that provides an angular transition between the ends 154 of approximately ninety degrees, although the curvature of the intermediate portion 160 of the corner node 150a is segmented into two forty-five degree angle transitions with a generally linear segment between the angle transitions. The intermediate portion 160 of the wheel well transition node 150c has a curvature that insets the wheel well reinforcement member 156 inside the rear wheels of the vehicle, such as shown in FIGS. 8 and 9. The module nodes 150 may be formed via extrusion or pultrusion or casting to have a generally consistent cross-sectional shape extending along a vertical direction relative to the associated vehicle frame and generally orthogonal to the hollow interior 134 of the elongated reinforcement members 124 engaged with the respective module node 150. As such, the nodes may be extruded or pultruded from aluminum, polymer, composites, or like materials, or conceivably cast or molded.

The cross-section of the nodes 150 may have an open interior portion 162 extending through the module node and arranged to extend generally in a vertical direction relative to the vehicle frame. As illustrated, the open interior portions 162 of the nodes 150 are divided by structural ribs 164 that extend vertically and in alignment with the exterior surfaces of the nodes 150. By vertically arranging the extrusion direction of the node 150, the exterior wall surface 166 that forms a portion of the interior surface of the additional battery containment area 152 is substantially unobstructed to provide a seal with the other portions of the containment wall.

Figure 18:
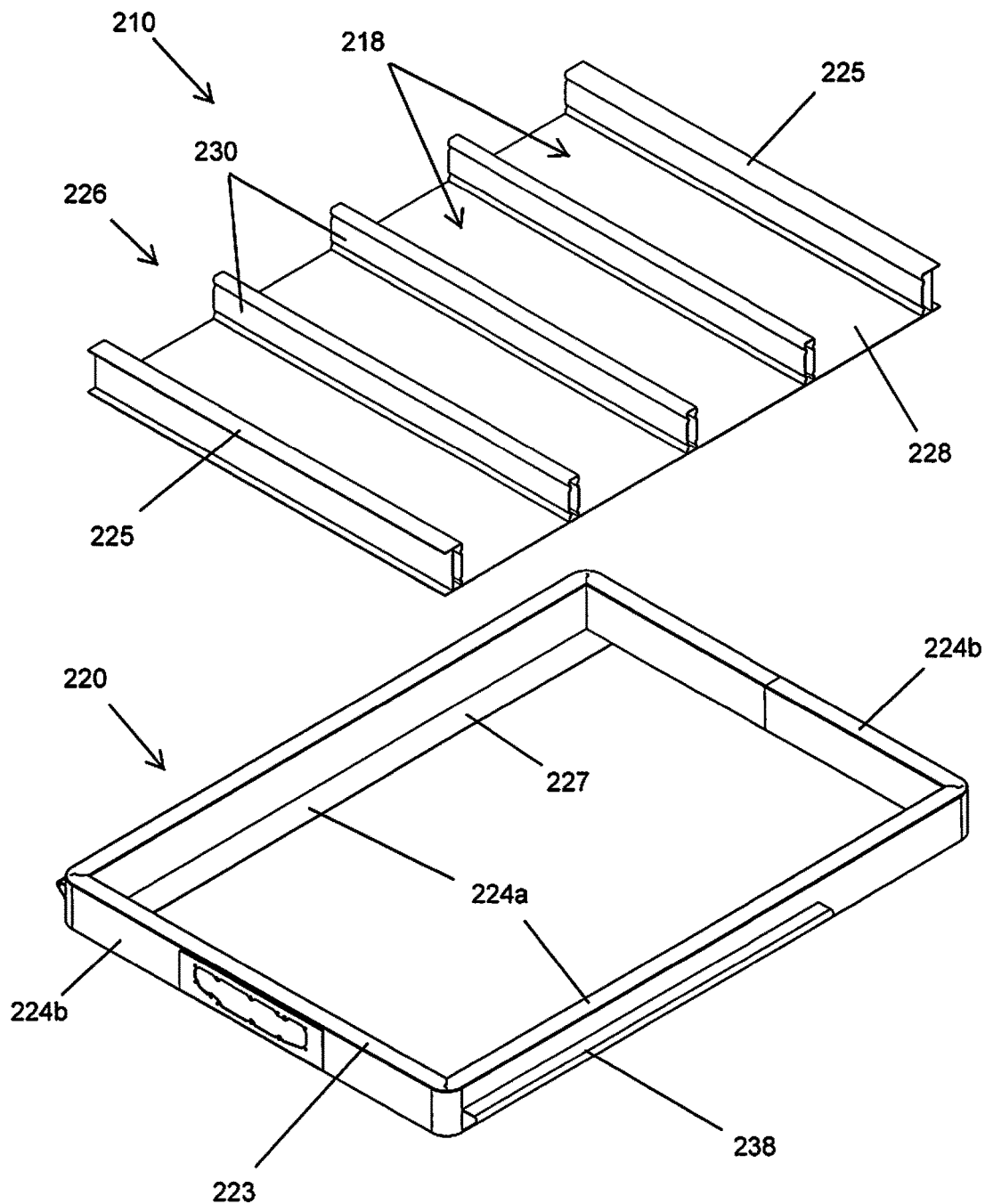
FIG. 18 is an exploded, upper perspective view of an additional embodiment of a battery tray with a pultruded tray component and a metallic outer frame.
Figure 18A:
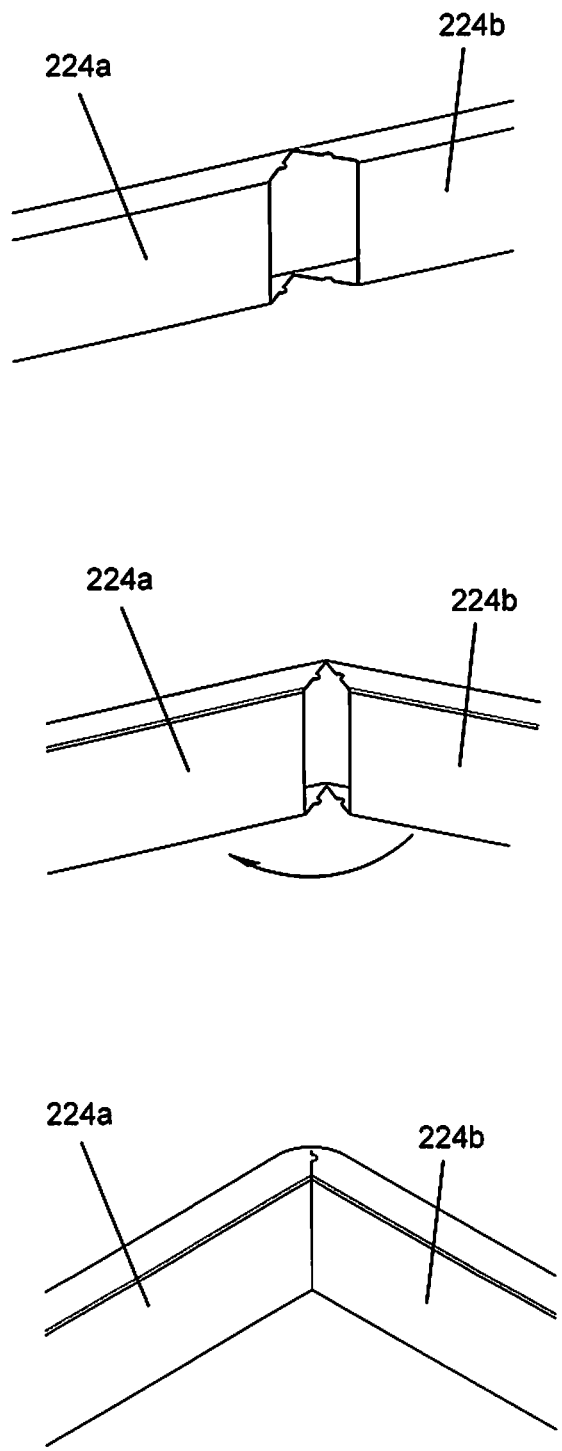
FIG. 18A shows upper perspective views of a formation process of the metallic outer frame of the battery tray shown in FIG. 18.

Referring now to the embodiments of the battery tray 210 shown in FIG. 18, which also includes two tray components or pieces that attach or mate together to form sealed and separate battery containment areas 218 spaced longitudinally along the vehicle frame. The lower or outer tray component 220, such as shown in FIG. 18, may have longitudinal and lateral elongated reinforcement members 224a, 224b formed to provide a peripheral structure around an open area without a panel portion. Thus, the upper or inner tray component 226, as also shown in FIG. 18, may have a panel portion 228 with cross members 230 integrally extending laterally across an upper surface of the panel portion 228. The inner tray component 226 may be pultruded to have a substantially constant cross-section laterally along the length of the cross members 230 and may have different materials disposed at different sections of the respective tray component.

As further shown in FIG. 18, to attach the outer and inner tray components 220, 226 together, the upper or inner tray component 226 may be arranged in a contrasting or polarized manner relative to the longitudinally extending reinforcement members 224a of the outer tray component 220, such as with their length generally perpendicular to the formation direction of the cross members 230. To support the weight of the batteries, the upper edge 223 of the lower or outer tray component 220 may receive a flange 225 that protrudes from the respective forward or reward end of the upper or inner tray component 226 to support the inner tray component 226. To further support the weight of the tray contents, such as shown in FIG. 18, the longitudinally extending reinforcement members 224a may include inward protruding flanges 227 that support the lower edge of the panel portion 128 of the inner tray component 226. In this arrangement, the cross members 230 to extend between the longitudinal elongated reinforcement members 224a and thereby define the separate battery containment areas that are each generally bound on four sides by the cross members 130 and the longitudinal elongated reinforcement members 224a. It is also contemplated that, alternatively, the outer tray component may lack laterally extending reinforcement members and may simply provide longitudinal elongated reinforcement members or side rails that are attached at the lateral portions of the inner component. In such an arrangement, the side rails may be extruded aluminum members and may engage the ends of the cross members to bound the separate battery containment areas in a sealed manner.

The longitudinal reinforcement members 224a shown in FIG. 18 also includes an outer tube 238 that has a generally triangular-shaped cross section and that is arranged laterally outside the longitudinal reinforcement members 224a, so provide additional structure for impact energy management. Features of the battery tray 210 that are similar to the battery tray 10 and 110 are not described in detail again, and similar reference numbers are used, incremented by 200 and 100, respectively.

One or both of the tray components may be pultruded or extruded or roll formed to have a substantially constant cross-section along the length of the respective elongated reinforcement members and cross members. When being pultruded or extruded or roll formed, the tray component is formed as a single integral piece and cut to size from the generally continuous length of the pultrusion or extrusion or roll formed component. It is also contemplated that the cross members and reinforcement members in additional embodiments may be separately formed, such as when attached separately to a tray component formed with respective reinforcement members or cross members integrally protruding from a panel portion of the tray component. For example, the reinforcement members or cross members may be separately roll formed or pultruded or extruded or stamped, such as with a different material than the tray component and with a shape to accommodate the function at its area of the tray.

Figure 19:
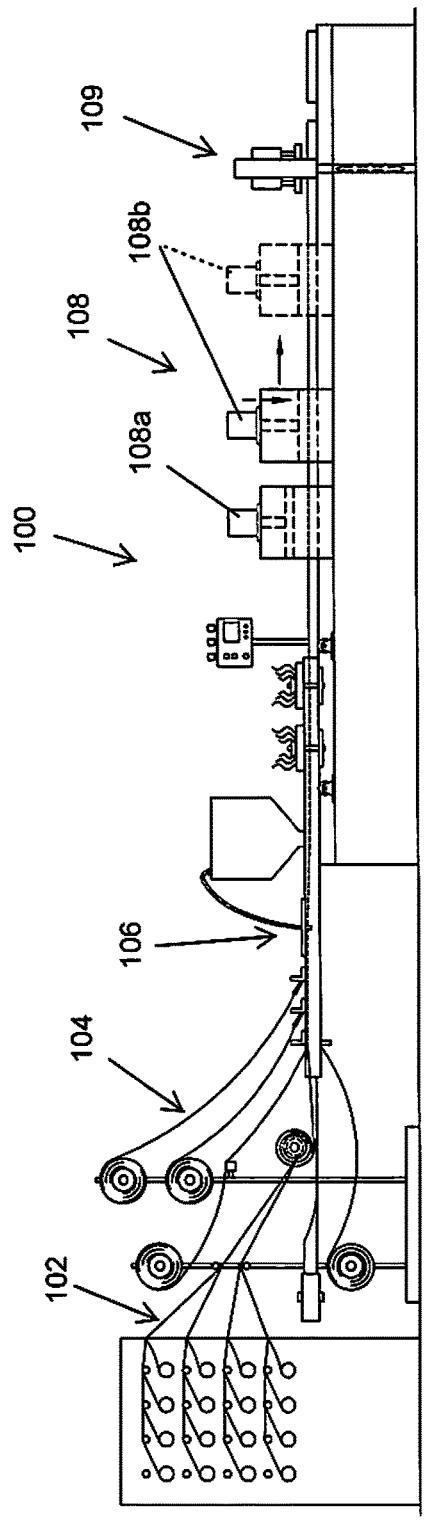
FIG. 19 is an elevational schematic view of a pultrusion apparatus.
Figure 20:
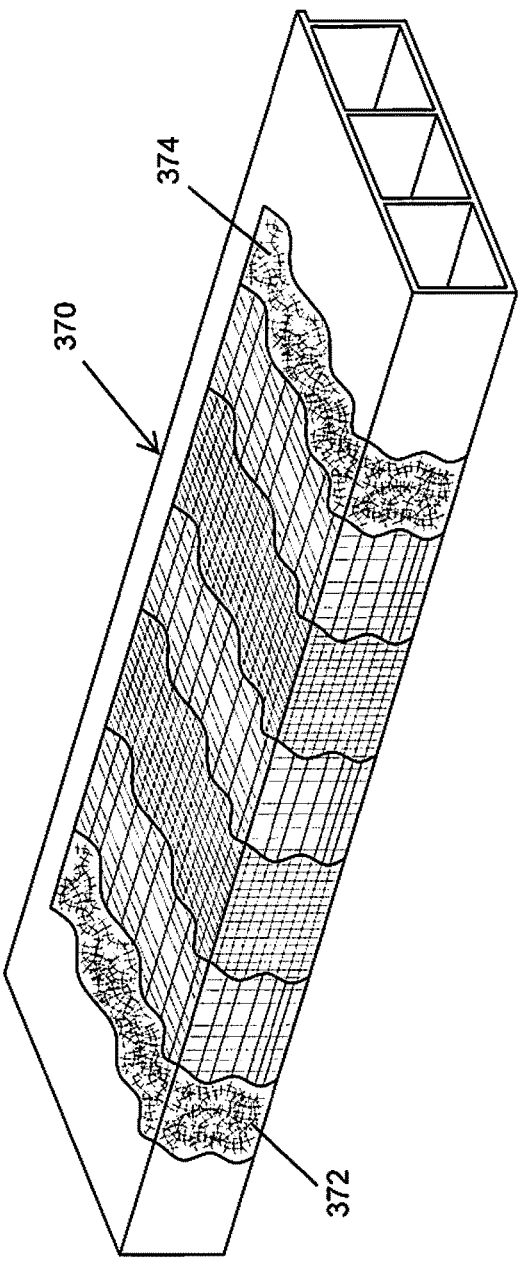
FIG. 20 is an upper perspective view of an exemplary pultruded component formed with the pultrusion apparatus shown in FIG. 19, showing cutaway layers to expose various layers of the different materials used in the pultruded component.

A pultrusion of one of the tray components may have different sections with different materials, such as shown in FIG. 20 with one material 372 disposed at an upper section of the respective tray component and another material 374 disposed at a lower section of the respective tray component 370. As shown in FIG. 19, the pultrusion process 100 incorporates different fiber strands 102 from spools that are fed with a sheet material 104 into a pultrusion die where a resin system 106 is injected over the die profile before being heated and cured into the desired component profile. More specifically, a creel system has a rack of bobbins or spools with several different types of strands or filaments 102, such as fiber glass or carbon fiber or the like, that may be selected to be fed into the component. Additionally, as shown in FIG. 19, fabrics spools 104 may feed additional strips of woven fabric or sheets of material into the component. The receiving end of the pultrusion die has an injection box that injects the resin system 106, which is preferably a resin with a high glass transition temperature, such as polyurethane or other thermosetting resin, although thermoplastic resins may conceivably be used. The resin system 106 coats and infuses the accumulation of fibers and fabrics, such that as the fibers and fabrics serve as the structural support for the resin to adhere and form the profile of the component. The resin coated accumulation of fabrics and fibers is then heated in the die, so as to cure the resin in the desired profile. A system of pullers 108 may be used to continuously draw the cured profile from the heated die. As shown, the pullers 108 may provide a first puller 108a that has a press that engages the cured profile at an upstream location and then pulls the cured profile downstream to a second location, where a second puller 108b is used to engage and continue to draw the cured profile while the first puller 108a moves back to the first location. These pullers 108 thereby work in sequence to provide the continuous pulling operation. Further, as shown in FIG. 19, a cutoff station 109 is provided after the pullers 108 to cut the cured profile to the desired length of the resulting component, such as the desired tray component length.

In one embodiment of the inner tray component, it may be pultruded to have a glass material or a similar composite material disposed at the panel portion and to have a carbon fiber reinforced thermoplastic or similar resin-based composite material disposed at one or more of the cross members. With such a construction, the properties of the carbon fiber in the cross members provides rigidity, stiffness, and strength in the lateral dimension of the battery tray, such as for increased axial loading when receiving lateral impact forces to the vehicle and thereby optimized for crush deformation. However, a glass material may be provided as a low cost material to form the base layer or panel portion that interconnects the cross members. In one embodiment of the outer tray component, it may be pultruded to have an aramid material (such as Kevlar) or a similar synthetic fiber material disposed at the panel portion and to have a carbon fiber or similar composite material disposed at the side reinforcement members. With such a construction, the properties of the carbon fiber in the reinforcement members provides rigidity and strength in the longitudinal dimension of the battery tray, such as to improve side impact and torsional loading, while the an aramid material (such as Kevlar) provides a light weight panel portion that has high puncture resistance and impact absorption. It is also contemplated that a thin metal plate or sheet, such a metal with a high strength to weight ratio, such as steel or aluminum, may be disposed at one of the panel portions or may be generally sandwiched between the panel portions during assembly to provide ductility and additional structural reinforcement and puncture resistance. It is conceivable that these and other materials may be selected to accommodate the desired performance characteristics of different sections of the respective tray component, such that the battery tray 10 performance characteristics may be tailored over different sections of the tray.

With further reference to the method of forming a battery tray, such as shown in FIG. 12, the method includes forming or otherwise providing the outer and inner tray components, where the tray components has a consistent cross-sectional shape along their lengths. The outer and/or inner tray components may be pultruded or extruded to have a substantially constant cross-section along the length of their respective elongated reinforcement members and cross members. Further, when using pultrusion, the outer and/or inner tray components may be integrally formed to have one material disposed at an upper section of the respective tray component and another material disposed at a lower section of the respective tray component, such as carbon fiber, aramid, or glass or other conceivably desirable materials. The upper panel portion of the inner tray component is then disposed over the lower panel portion of the lower tray component, so as to position the cross members to extend between and generally perpendicular to the elongated reinforcement members, thereby defining a battery containment area between each of the plurality of cross members. The cross members span laterally between the side reinforcement members, such that lateral impact force is transmitted through load paths along the cross members to limit disruption to the battery containment areas. Several different attachment techniques and configurations may be used to permanently or releasable secure the battery tray to a vehicle frame, such as below a floor of the vehicle and generally between the axles. Further, with respect to the general installation or attachment or formation, the steps discussed herein may be performed in various different sequences from those discussed to result engaging, disengaging, or forming the battery support structure or components thereof.

For purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A battery tray for a vehicle, said battery tray comprising:
    a first tray component having a first panel portion and elongated reinforcement members integrally coupled at opposing edges of the first panel portion and extending in parallel alignment with each other;
    a second tray component having a second panel portion and a plurality of cross members integrally extending across the second panel portion;
    wherein the second panel portion is disposed at an upper surface of the first panel portion with the plurality of cross members extending between the elongated reinforcement members so as to provide a battery containment area between the plurality of cross members; and
    wherein opposing ends of the plurality of cross members directly engage inside surfaces of the elongated reinforcement members to provide the battery containment area with an interior peripheral surface.

2. The battery tray of claim 1, wherein the plurality of cross members are disposed substantially perpendicularly relative to the elongated reinforcement members.

3. The battery tray of claim 2, wherein the plurality of cross members extend linearly and substantially parallel relative to each other.

4. The battery tray of claim 1, wherein at least one of the first and second tray components comprises a substantially constant cross-section along a length of the respective elongated reinforcement members and plurality of cross members.

5. The battery tray of claim 1, wherein at least one of the first and second tray components comprises a single integral piece fabricated from a first material disposed at an upper section of the respective tray component and a second material disposed at a lower section of the respective tray component, and wherein the first material includes carbon fiber and the second material includes at least one of aramid or glass.

6. The battery tray of claim 1, wherein the first tray component comprises a constant cross-section along a length of the elongated reinforcement members and the second tray component comprises a constant cross-section along a length off the plurality of cross members, and wherein the lengths of the first and second tray components are disposed in an orthogonal orientation relative to each other.

7. The battery tray of claim 1, wherein the side reinforcement members each include a multi-tubular shape with at least two elongated hollow cavities extending longitudinally along a length of the reinforcement members.

8. The battery tray of claim 1, wherein front and rear cross members of the plurality of cross members are attached via an adhesive or a sealer at inside surfaces of the elongated reinforcement members.

9. A battery tray for a vehicle, said battery tray comprising:
    a first tray component having a first panel portion and a pair of elongated reinforcement members integrally protruding upward from opposing edges of the first panel portion;
    a second tray component having a second panel portion and a plurality of cross members disposed at an upper surface of the second panel portion with the plurality of cross members extending between the elongated reinforcement members; and
    wherein opposing ends of front and rear cross members of the plurality of cross members directly engage inside surfaces of the pair of elongated reinforcement members to form a peripheral wall of a battery containment area.

10. The battery tray of claim 9, wherein the plurality of cross members each comprise a length that is oriented perpendicularly relative to a length of the pair of elongated reinforcement members.

11. The battery tray of claim 9, wherein the first tray component comprises a substantially constant cross-section along a length of the pair of elongated reinforcement members.

12. The battery tray of claim 11, wherein the plurality of cross members each comprise a substantially constant cross-section along a length of the respective cross member, and wherein the lengths of the plurality of cross members are oriented perpendicularly relative to a length of the pair of elongated reinforcement members.

13. The battery tray of claim 9, wherein the first panel portion and the pair of elongated reinforcement members of the tray component are fabricated together to comprise a single integral piece.

14. The battery tray of claim 13, wherein the single integral piece of the first tray component comprises a first material disposed at an upper section of the first tray component and a second material disposed at a lower section of the first tray component, and wherein the first material includes carbon fiber disposed at the pair of elongated reinforcement members and the second material includes at least one of aramid and glass disposed at the panel portion.

15. The battery tray of claim 9, wherein the pair of side reinforcement members each include a multi-tubular shape with at least two elongated hollow cavities extending along a length of the respective side reinforcement member.

16. The battery tray of claim 9, wherein front and rear cross members of the plurality of cross members are directly engaged via an adhesive or a sealer at inside surfaces of the pair of elongated reinforcement members.

17. The battery tray of claim 9, wherein the tray component comprises a constant cross-section along a length of the elongated reinforcement members, and wherein a floor panel is disposed over the panel portion of the tray component and integrally interconnects the plurality of cross members, and wherein the length of the elongated reinforcement members are disposed in an orthogonal orientation relative to a length of the plurality of cross members.

18. A battery tray for a vehicle, said battery tray comprising:
a first tray component having a first panel portion and a plurality of cross members integrally extending across the first panel portion;
a second tray component having a second panel portion and a pair of elongated reinforcement members; and
wherein upright surfaces of the pair of elongated reinforcement members directly engage opposing ends of the plurality of cross members so as to provide a sealed peripheral wall around a battery containment area disposed above the panel portion of the tray component.

19. The battery tray of claim 18, wherein the first tray component is pultruded or extruded as a single integral piece having a constant cross-section along a length of the plurality of cross members, and wherein the plurality of cross members extend substantially perpendicularly relative to the pair of elongated reinforcement members.

20. The battery tray of claim 19, wherein the second tray component is pultruded having a first material disposed at an upper section of the second tray component and a second material disposed at a lower section of the second tray component.

21. The battery tray of claim 18, wherein the pair of side reinforcement members each include a tubular shape with at least one elongated hollow cavity extending along a length of the respective side reinforcement member.

22. The battery tray of claim 18, wherein the opposing ends of the plurality of cross members directly engage the pair of elongated reinforcement members via a sealer.

* * * * *